US012073803B2

(12) United States Patent
Nakamura et al.

(10) Patent No.: US 12,073,803 B2
(45) Date of Patent: Aug. 27, 2024

(54) DUAL-PANEL LIQUID CRYSTAL DISPLAY DEVICE AND CONTROL METHOD FOR REDUCING RISK OF DISPLAYING KILLER PATTERN

(71) Applicant: Sharp Display Technology Corporation, Kameyama (JP)

(72) Inventors: Tatsunori Nakamura, Kameyama (JP); Takayuki Murai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/110,821

(22) Filed: Feb. 16, 2023

(65) Prior Publication Data

US 2023/0267892 A1 Aug. 24, 2023

Related U.S. Application Data

(60) Provisional application No. 63/313,175, filed on Feb. 23, 2022.

(51) Int. Cl.
*G09G 3/36* (2006.01)

(52) U.S. Cl.
CPC .................................. *G09G 3/3607* (2013.01)

(58) Field of Classification Search
CPC ...... G09G 3/36; G09G 3/3607; G09G 3/3611; G09G 3/3614; G09G 3/3622; G09G 3/3625; G09G 3/364; G09G 3/3644; G09G 3/3648; G09G 3/3666; G09G 3/3659; G09G 3/3674; G09G 3/3677; G09G 3/3681; G09G 3/3685; G09G 3/3688; G09G 3/3692; G09G 3/3696
USPC .................................................. 345/87–104
See application file for complete search history.

(56) References Cited

U.S. PATENT DOCUMENTS

| | | | | |
|---|---|---|---|---|
| 8,552,924 | B2 * | 10/2013 | Ikeno | G09G 3/3611 345/87 |
| 11,887,518 | B2 * | 1/2024 | Nakamura | G09G 3/007 |
| 2010/0118006 | A1 * | 5/2010 | Kimura | G09G 3/3611 348/673 |
| 2011/0115826 | A1 | 5/2011 | Fujiwara | |

(Continued)

FOREIGN PATENT DOCUMENTS

| | | | |
|---|---|---|---|
| JP | 2013156658 | A | 8/2013 |
| JP | 2018010063 | A | 1/2018 |

(Continued)

*Primary Examiner* — Ke Xiao
*Assistant Examiner* — Nelson Lam
(74) *Attorney, Agent, or Firm* — ScienBiziP, P.C.

(57) ABSTRACT

A display device includes: a first liquid crystal panel; a second liquid crystal panel disposed on a back face of the first liquid crystal panel; and a controller, wherein the controller determines, based on a maximum value of a target pixel value of the display device and a surrounding pixel value of the display device and a minimum value of the target pixel value and the surrounding pixel value, a value of a gray scale of a target pixel of the second liquid crystal panel with reference to at least one of a plurality of conversion characteristics indicating characteristics different from each other as characteristics configured to convert the target pixel value into the value of the gray scale of the target pixel of the second liquid crystal panel.

7 Claims, 24 Drawing Sheets

(56) References Cited

U.S. PATENT DOCUMENTS

| | | | | |
|---|---|---|---|---|
| 2012/0092385 | A1* | 4/2012 | Ikeno .................. | G09G 3/3611 345/88 |
| 2018/0151103 | A1* | 5/2018 | Koudo ................ | G09G 3/3607 |
| 2018/0286325 | A1* | 10/2018 | Koudo ................ | G09G 3/3688 |
| 2019/0392749 | A1 | 12/2019 | Koudo et al. | |
| 2020/0226968 | A1 | 7/2020 | Koudo et al. | |
| 2021/0142745 | A1 | 5/2021 | Kimura et al. | |

FOREIGN PATENT DOCUMENTS

| | | | |
|---|---|---|---|
| JP | 2018084760 | A | 5/2018 |
| JP | 2018169553 | A | 11/2018 |
| JP | 2019090886 | A | 6/2019 |
| JP | 2020064240 | A | 4/2020 |
| JP | 2020086379 | A | 6/2020 |
| WO | 2009054223 | A1 | 4/2009 |
| WO | 2012090358 | A1 | 7/2012 |
| WO | 2019225137 | A1 | 11/2019 |

* cited by examiner

| | WHEN ONLY FIRST CHARACTERISTIC IS APPLIED | WHEN ONLY SECOND CHARACTERISTIC IS APPLIED |
|---|---|---|
| IMAGE DISPLAYED BY FIRST LIQUID CRYSTAL PANEL | 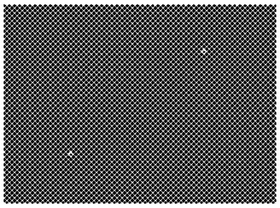 | 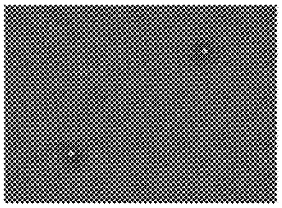 |
| IMAGE DISPLAYED BY SECOND LIQUID CRYSTAL PANEL |  | 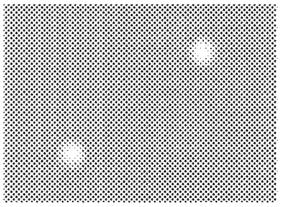 |
| HOW SECOND IMAGE IS SEEN WHEN DUAL-CELL DISPLAY IS OBSERVED FROM FRONT | 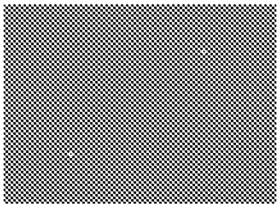 | 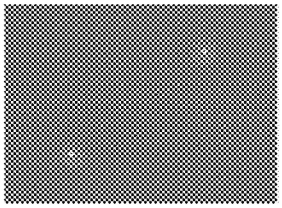 |
| HOW SECOND IMAGE IS SEEN WHEN DUAL-CELL DISPLAY IS OBSERVED FROM OBLIQUELY BELOW | 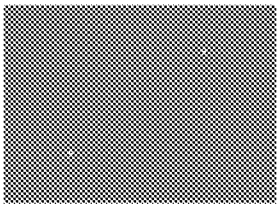 | 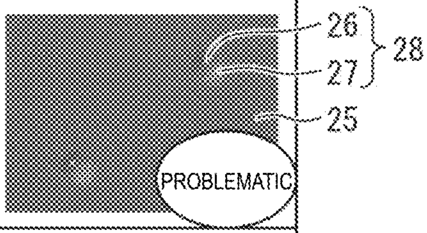  |
| REMARKS | APPEARS NORMAL. | EYEBALL UNEVENNESS IS SEEN. |

FIG. 8

| | | | | | | |
|---|---|---|---|---|---|---|
| 0.0 | 0.0 | 0.0 | 0.1 | 0.0 | 0.0 | 0.0 |
| 0.0 | 0.1 | 0.5 | 0.7 | 0.5 | 0.1 | 0.0 |
| 0.0 | 0.5 | 1.0 | 1.0 | 1.0 | 0.5 | 0.0 |
| 0.1 | 0.7 | 1.0 | 1.0 | 1.0 | 0.7 | 0.1 |
| 0.0 | 0.5 | 1.0 | 1.0 | 1.0 | 0.5 | 0.0 |
| 0.0 | 0.1 | 0.5 | 0.7 | 0.5 | 0.1 | 0.0 |
| 0.0 | 0.0 | 0.0 | 0.1 | 0.0 | 0.0 | 0.0 |

FIG. 24

DUAL-PANEL LIQUID CRYSTAL DISPLAY DEVICE AND CONTROL METHOD FOR REDUCING RISK OF DISPLAYING KILLER PATTERN

CROSS-REFERENCE TO RELATED APPLICATION

The present application claims priority from Provisional Application No. 63/313,175, the content to which is hereby incorporated by reference into this application.

BACKGROUND

1. Field

The disclosure relates to a display device and a control method.

2. Description of the Related Art

Conventionally, a display device including a first liquid crystal panel and a second liquid crystal panel disposed on a back face of the first liquid crystal panel is known. Such a display device is also referred to as a dual-cell display or a dual-panel display (hereinafter, unified to the dual-cell display), and is capable of achieving a display of a high contrast by performing display by using the first liquid crystal panel and the second liquid crystal panel.

CITATION LIST

Patent Literature

PTL 1: JP 2018-169553 A
PTL 2: JP 2020-86379 A
PTL 3: JP 2018-10063 A
PTL 4: WO 2009/54223
PTL 5: WO 2012/90358
PTL 6: JP 2019-90886 A
PTL 7: JP 2013-156658 A
PTL 8: WO 2019/225137
PTL 9: JP 2020-64240 A
PTL 10: JP 2018-84760 A

SUMMARY

The inventors of the present application have newly found that a dual-cell display has a risk of displaying a killer pattern. The killer pattern is an image that has degraded quality, which is displayed on the dual-cell display under a certain condition.

(1) An embodiment of the disclosure is a display device including a first liquid crystal panel, a second liquid crystal panel disposed on a back face of the first liquid crystal panel, and a controller, in which the controller determines, based on a maximum value of a target pixel value of the display device and a surrounding pixel value of the display device and a minimum value of the target pixel value and the surrounding pixel value, a value of a gray scale of a target pixel of the second liquid crystal panel with reference to at least one of a plurality of conversion characteristics indicating characteristics different from each other as characteristics configured to convert the target pixel value into the value of the gray scale of the target pixel of the second liquid crystal panel.

(2) Furthermore, in a certain embodiment of the disclosure, in addition to the above-described configuration (1), the plurality of conversion characteristics include a first characteristic and a second characteristic, and when the target pixel values are identical, a value of the gray scale of the target pixel of the second liquid crystal panel determined with reference to only the first characteristic is equal to or more than a value of the gray scale of the target pixel of the second liquid crystal panel determined with reference to only the second characteristic.

(3) Furthermore, in a certain embodiment of the disclosure, in addition to the above-described configuration (2), the controller determines the value of the gray scale of the target pixel of the second liquid crystal panel with reference to the second characteristic when the maximum value is less than a predetermined value, and when a difference between the maximum value and the minimum value is greater than 0, and the controller determines the value of the gray scale of the target pixel of the second liquid crystal panel with reference to the first characteristic when the maximum value is equal to or greater than the predetermined value, or when the difference is 0.

(4) Furthermore, in a certain embodiment of the disclosure, in addition to the above-described configuration (2), the controller increases a ratio of a component corresponding to the second characteristic in the value of the gray scale of the target pixel of the second liquid crystal panel as a difference between the maximum value and the minimum value increases.

(5) Furthermore, in a certain embodiment of the disclosure, in addition to the above-described configuration (2), the controller determines the value of the gray scale of the target pixel of the second liquid crystal panel by a formula below $$(1-\mathrm{Min}/\mathrm{Max})\times P2+(\mathrm{Min}/\mathrm{Max})\times P1,$$

where the maximum value is Max, the minimum value is Min, the value of the gray scale of the target pixel of the second liquid crystal panel determined with reference to only the first characteristic is P1, the value of the gray scale of the target pixel of the second liquid crystal panel determined with reference to only the second characteristic is P2.

(6) Furthermore, in a certain embodiment of the disclosure, in addition to the above-described configuration of any one of (2) to (5), the controller generates the first characteristic based on a product of the value of the gray scale of the target pixel of the second liquid crystal panel determined with reference to only the second characteristic and a predetermined coefficient of one or more.

(7) Furthermore, in a certain embodiment of the disclosure, in addition to the above-described configuration (6), when the product is equal to or greater than an upper limit value of the gray scale of the target pixel of the second liquid crystal panel, the controller sets the upper limit value as the value of the gray scale of the target pixel of the second liquid crystal panel determined with reference to only the first characteristic.

(8) Furthermore, in a certain embodiment of the disclosure, in addition to the above-described configuration of any one of (1) to (7), the display device further includes a downsampling unit configured to perform downsampling on first image data to generate second image data including the target pixel value and the surrounding pixel value, and to supply the second image data to the controller.

(9) Furthermore, in a certain embodiment of the disclosure, in addition to the above-described configuration of any one of (1) to (8), the display device further includes an image extension unit configured to perform image extension processing on output data from the controller.

(10) An embodiment of the disclosure is a control method of a display device including a first liquid crystal panel and a second liquid crystal panel disposed on a back face of the first liquid crystal panel, the control method including determining, based on a maximum value of a target pixel value of the display device and a surrounding pixel value of the display device and a minimum value of the target pixel value and the surrounding pixel value, a value of a gray scale of a target pixel of the second liquid crystal panel with reference to at least one of a plurality of conversion characteristics indicating characteristics different from each other as characteristics configured to convert the target pixel value into the value of the gray scale of the target pixel of the second liquid crystal panel.

According to the disclosure, a display device, in which a risk of displaying a killer pattern is reduced, can be achieved.

BRIEF DESCRIPTION OF DRAWINGS

FIG. 8 is a table summarizing an image displayed by the first liquid crystal panel, an image displayed by the second liquid crystal panel, how the second image is seen when the dual-cell display is observed from the front, and how the second image is seen when the dual-cell display is observed from obliquely below, when the dual-cell display displays the second image.

FIG. 24 is an example of a filter used in image extension processing.

DETAILED DESCRIPTION OF EMBODIMENTS

Figure 1:
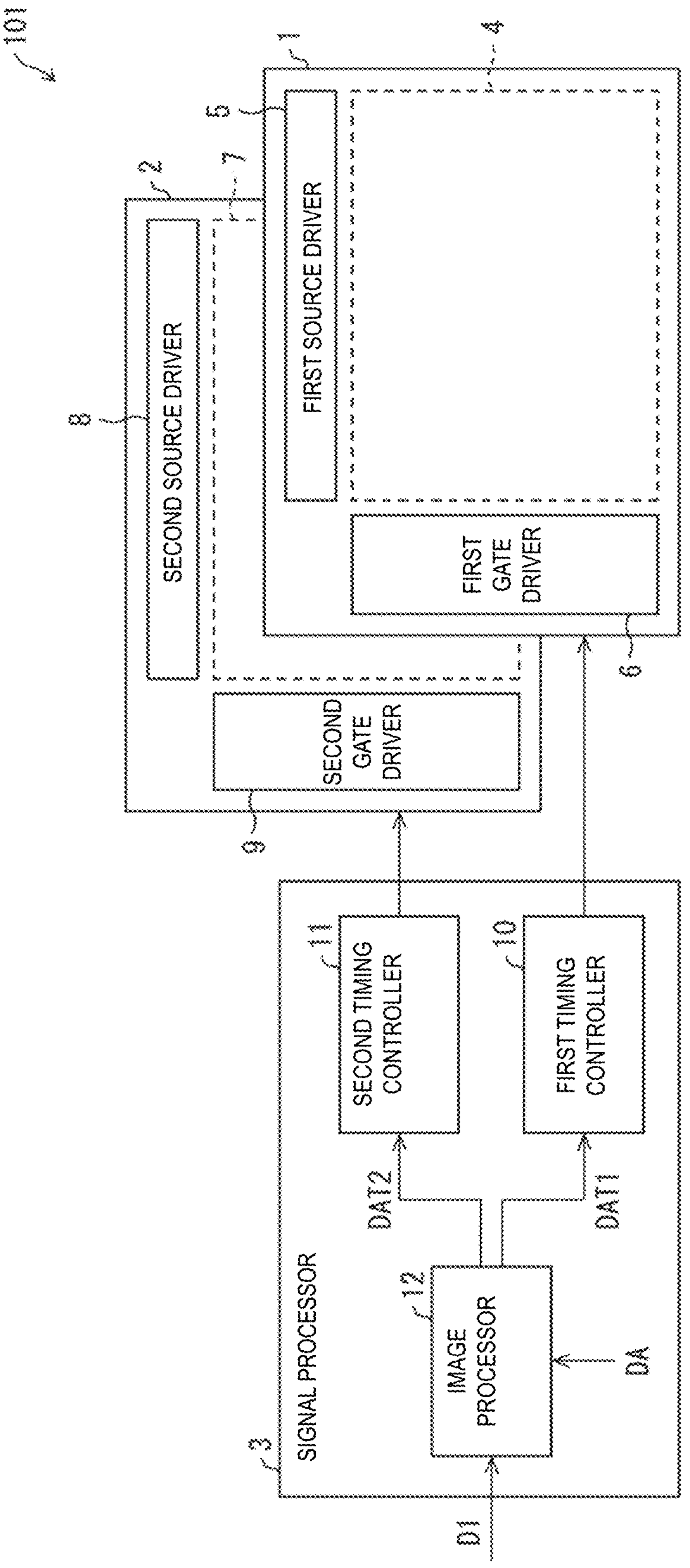
FIG. 1 is a schematic diagram of a display device according to the disclosure.

Embodiments of the disclosure will be described below. Note that, for convenience of description, members having the same functions as those of the members described earlier may be denoted by the same reference numerals and signs, and the description thereof will not be repeated.

First Embodiment

FIG. 1 is a schematic diagram of a display device 101 according to the disclosure. The display device 101 includes a first liquid crystal panel 1, a second liquid crystal panel 2 disposed on a back face of the first liquid crystal panel 1, and a signal processor 3. An arrangement of the first liquid crystal panel 1 is closer to an observer of the display device 101 than an arrangement of the second liquid crystal panel 2 is. The display device 101 is a dual-cell display capable of achieving display of a high contrast by performing display by using the first liquid crystal panel 1 and the second liquid crystal panel 2.

The first liquid crystal panel 1 includes a display region 4, a first source driver 5, and a first gate driver 6. The second liquid crystal panel 2 includes a display region 7, a second source driver 8, and a second gate driver 9. The display region 4 is a region where the first liquid crystal panel 1 displays an image, and the display region 7 is a region where the second liquid crystal panel 2 displays an image. Although not illustrated, the first liquid crystal panel 1 further includes a red color filter, a green color filter, and a blue color filter.

The signal processor 3 includes a first timing controller 10, a second timing controller 11, and an image processor 12.

In the display device 101, first image data D1 transmitted from an external system (not illustrated) is input to the image processor 12. The image processor 12 generates data DAT1 for driving the first liquid crystal panel 1 and data DAT2 for driving the second liquid crystal panel 2 based on the first image data D1 and reference data DA. The image processor 12 supplies the data DAT1 to the first timing controller 10, and supplies the data DAT2 to the second timing controller 11.

The data DAT1 and a first control signal (not illustrated) are input to the first timing controller 10. The first timing controller 10 generates various signals for driving the first source driver 5 and the first gate driver 6 based on the data DAT1 and the first control signal to supply the various signals to the first liquid crystal panel 1.

The data DAT2 and a second control signal (not illustrated) are input to the second timing controller 11. The second timing controller 11 generates various signals for driving the second source driver 8 and the second gate driver 9 based on the data DAT2 and the second control signal to supply the various signals to the second liquid crystal panel 2.

Each of the first control signal and the second control signal includes, for example, a clock signal, a vertical synchronization signal, and a horizontal synchronization signal. Each of various signals for driving the first source driver 5 and various signals for driving the second source driver 8 includes, for example, a respective one of a data start pulse, a data clock, and data of an image corresponding to the first image data D1. Each of various signals for driving the first gate driver 6 and various signals for driving the second gate driver 9 includes, for example, a respective one of a gate start pulse, and a gate clock.

Refer to the technology disclosed in PTL 10 for the schematic configuration of the display device 101 described above.

A pixel of the first liquid crystal panel 1 and a pixel of the second liquid crystal panel 2 are arranged associated with each other. A corresponding relationship between the pixel of the first liquid crystal panel 1 and the pixel of the second liquid crystal panel 2 may be one pixel to one pixel, may be one pixel to a plurality of pixels, or may be a plurality of pixels to a plurality of pixels. Furthermore, the pixel of the display device 101 is a generic term for the pixel of the first liquid crystal panel 1 and the pixel of the second liquid crystal panel 2 corresponding to each other.

A target pixel of the display device 101 is certain one pixel of the display device 101. Surrounding pixels of the display device 101 are at least one pixel of the display device 101 located around the target pixel of the display device 101. A target pixel of the second liquid crystal panel 2 is at least one pixel of the second liquid crystal panel 2 corresponding to the target pixel of the display device 101.

A target pixel value of the display device 101 is a pixel value of the target pixel of the display device 101. A surrounding pixel value of the display device 101 is a pixel value of the surrounding pixel of the display device 101 existing for each pixel of the surrounding pixels of the display device 101.

Note that the pixel of the first liquid crystal panel 1 include red (R), green (G), and blue (B). The pixel of the second liquid crystal panel 2 may include R, G, and B, or may include white (W) instead of R, G, and B. In a general dual-cell display, the pixel of the second liquid crystal panel 2 may include W. When the pixel of the second liquid crystal panel 2 includes W, a color filter is not required in the second liquid crystal panel 2. Since the second liquid crystal panel 2 does not include a color filter, an aperture ratio increases, and a power consumption is low in the second liquid crystal panel 2. In the disclosure, it can be construed that a description is made with focusing on one of a pixel value of R, a pixel value of G, a pixel value of B, and a pixel value of W.

Figure 2:
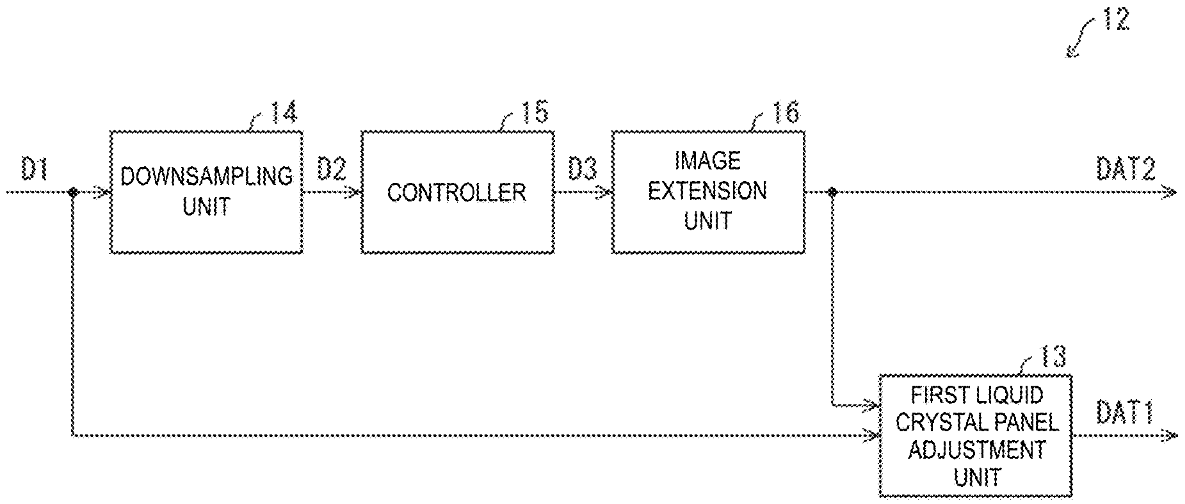
FIG. 2 is a block diagram illustrating a schematic configuration of an image processor.

FIG. 2 is a block diagram illustrating a schematic configuration of the image processor 12. The image processor 12 includes a first liquid crystal panel adjustment unit 13, a downsampling unit 14, a controller 15, and an image extension unit 16.

The first image data D1 includes a pixel value of each pixel of the display device 101 including the target pixel value of the display device 101 and the surrounding pixel values of the display device 101. The first image data D1 is input to the first liquid crystal panel adjustment unit 13 and the downsampling unit 14.

The downsampling unit 14 performs downsampling on the first image data D1 to generate second image data D2 including the pixel value of each pixel of the display device 101. The downsampling unit 14 supplies the second image data D2 to the controller 15.

The downsampling unit 14 performs processing of reducing the size of the first image data D1 in accordance with a resolution of the second liquid crystal panel 2. The maximum value of a plurality of pixel values corresponding to a certain region of the image indicated by the first image data D1 may be a pixel value corresponding to the region after the downsampling. Examples of the processing of reducing the size of the first image data D1 include thinning processing and filter processing.

The controller 15 refers to a characteristic (conversion characteristic) of converting the target pixel value of the display device 101 to a value of a gray scale of the target pixel of the second liquid crystal panel 2, and determines the value of the gray scale of the target pixel of the second liquid crystal panel 2. The controller 15 outputs the value of the gray scale of the target pixel of the second liquid crystal panel 2 as a third image data (output data from the controller) D3. Details of processing in the controller 15 is described later.

The image extension unit 16 performs image extension processing on the third image data D3 output from the controller 15, and outputs the third image data D3 as the data DAT2. In this image extension processing, filter processing using, for example, a filter of seven rows and seven columns is applied to the target pixel of the second liquid crystal panel 2, and thus so-called image thickening processing is performed. An example of the filter is illustrated in FIG. 24. In this filter, the seven row and the seven columns are in one-to-one correspondence with seven pixels×seven pixels. Numbers of 0.0 to 1.0 each described for a respective one of coordinates of the seven rows and the seven columns are coefficients necessary for performing the filter processing.

In the display device 101, since there is a thickness between the first liquid crystal panel 1 and the second liquid crystal panel 2, when the same image (for example, a longitudinal line of one dot) is displayed on the first liquid crystal panel 1 and the second liquid crystal panel 2, and the display device 101 is obliquely observed, there is a risk that the image may be missing and not be visible. Thus, it is necessary to thickening the image displayed on the second liquid crystal panel 2 as compared with the image displayed on the first liquid crystal panel 1.

The first liquid crystal panel adjustment unit 13 performs adjustment on the first image data D1 based on the data DAT2 output by the image extension unit 16, and generates and outputs the data DAT1. The first liquid crystal panel adjustment unit 13 generates the data DAT1 indicating a low value when the value indicated by the data DAT2 is high, and generates the data DAT1 indicating a high value when the value indicated by the data DAT2 is low. The first liquid crystal panel adjustment unit 13 may perform division processing.

The first image data D1 may include data of RGB. The second image data D2 may include a pixel value corresponding to brightness data (Y) obtained from the data of RGB or data of the maximum value of RGB. The data DAT2 may be data such as a value of a gray scale corresponding to the brightness data (Y), and the pixel of the second liquid crystal panel 2 may be driven by the data. The data DAT1 may be data of RGB, or may be calculated by data of RGB of an input and the data DAT2 or the like from the image extension unit 16.

Figure 3:
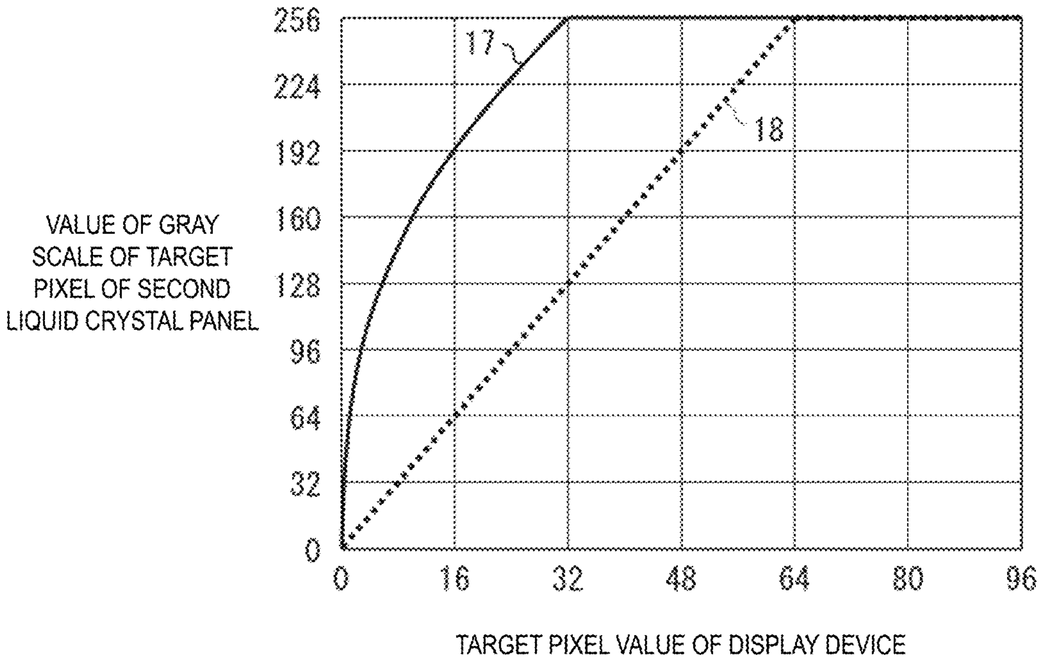
FIG. 3 is a graph showing two conversion characteristics.

FIG. 3 is a graph showing two conversion characteristics. In the graph, the horizontal axis represents the target pixel value of the display device 101, and the vertical axis represents the value of the gray scale of the target pixel of the second liquid crystal panel 2. The two conversion characteristics (plurality of conversion characteristics) include a first characteristic 17 and a second characteristic 18.

The first characteristic 17 is obtained by assigning the target pixel values from “0” to “32” of the display device 101 to the gray scale values from “0” to “255” of the target pixels of the second liquid crystal panel 2. The second characteristic 18 is obtained by assigning the target pixel values from “0” to “64” of the display device 101 to the gray scale values from “0” to “255” of the target pixels of the second liquid crystal panel 2. Each of the first characteristic 17 and the second characteristic 18 is a characteristic in which the value of the gray scale of the target pixel of the second liquid crystal panel 2 does not decrease as the target pixel value of the display device 101 increases. The value “255” of the gray scale of the target pixel of the second liquid crystal panel 2 is uniformly assigned to the target pixel values greater than “32” of the display device 101 in the first characteristic 17, and the target pixel values greater than “64” of the display device 101 in the second characteristic 18.

When the target pixel values of the display device 101 are identical, the value of the gray scale of the target pixel of the second liquid crystal panel 2 determined with reference to only the first characteristic 17 is equal to or greater than the value of the gray scale of the target pixel of the second liquid crystal panel 2 determined with reference to only the second characteristic 18.

Information related to the first characteristic 17 and/or information related to the second characteristic 18 may be generated and/or stored in the display device 101, or may be input to the display device 101 from the outside of the display device 101. An example of the reference data DA (see FIG. 1) described above is the information related to the first characteristic 17 and/or the information related to the second characteristic 18.

Two examples will now be described for a mechanism by which a killer pattern is displayed in the dual-cell display. For convenience of description, members corresponding to members of the display device 101 are denoted by the same reference numerals as the members of the display device 101.

Figure 4:
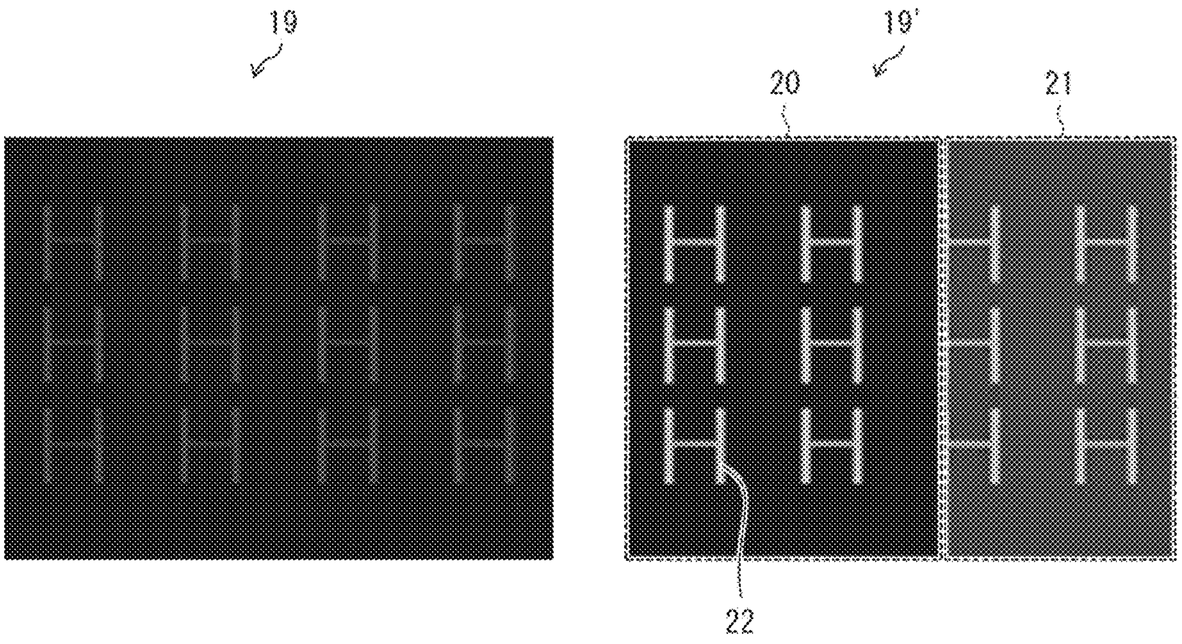
FIG. 4 is a diagram illustrating a first image.

FIG. 4 is a diagram illustrating a first image 19. A first image 19' is obtained by enhancing contrast of the first image 19. According to the first image 19', the first image 19 includes an object 22 with backgrounds 20 and 21 as backgrounds of the first image 19. A target pixel value of the dual-cell display corresponding to the background 20 is “0”, a target pixel value of the dual-cell display corresponding to the background 21 is “8”, and a target pixel value of the dual-cell display corresponding to the object 22 is “32”. The target pixel value of the dual-cell display corresponds to the target pixel value of the display device 101.

Figure 5:
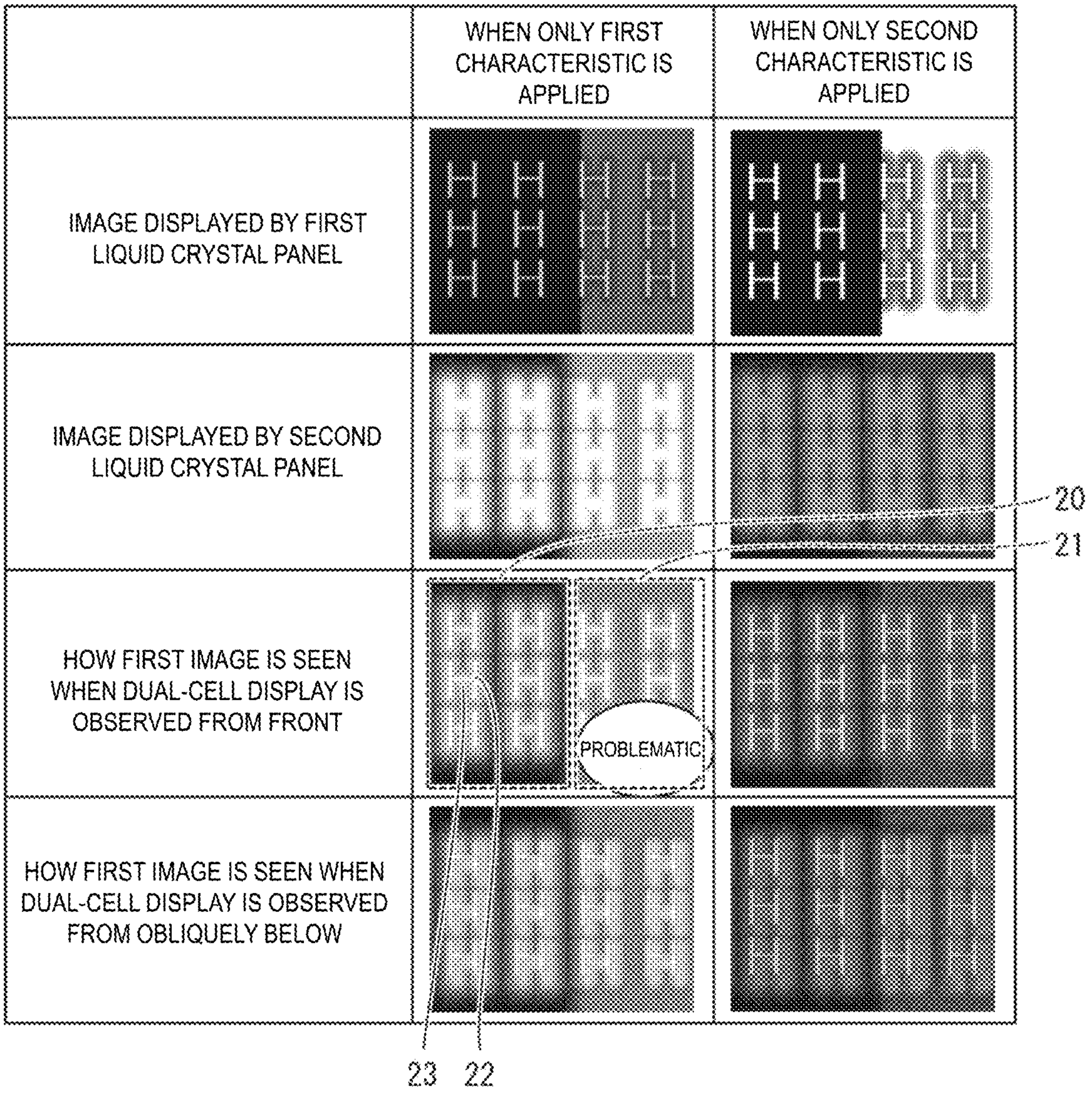
FIG. 5 is a table summarizing an image displayed by a first liquid crystal panel, an image displayed by a second liquid crystal panel, how the first image is seen when a dual-cell display is observed from the front, and how the first image is seen when the dual-cell display is observed from obliquely below, when the dual-cell display displays the first image.

FIG. 5 is a table summarizing an image displayed by the first liquid crystal panel 1, an image displayed by the second liquid crystal panel 2, how the first image 19 is seen when the dual-cell display is observed from the front, and how the first image 19 is seen when the dual-cell display is observed from obliquely below, when the dual-cell display displays the first image 19. FIG. 5 illustrates each of a case where only the first characteristic 17 is applied and a case where only the second characteristic 18 is applied. FIG. 5 is illustrated based on calculation simulation. In FIG. 5, the image displayed by the first liquid crystal panel 1, how the first image 19 is seen when the dual-cell display is observed from the front, and how the first image 19 is seen when the dual-cell display is observed from obliquely below are enhanced in contrast more than an actual image.

In a case where the first image 19 is displayed on the dual-cell display by applying only the first characteristic 17, the value of the gray scale of the target pixel of the second liquid crystal panel 2 corresponding to the object 22 is “255”. In addition, an image corresponding to the third image data D3 is thickened by the image extension unit 16. As a result, in the case where the first image 19 is displayed on the dual-cell display by applying only the first characteristic 17, a halo 23 is generated around the object 22 when the dual-cell display is observed from the front.

Figure 6:
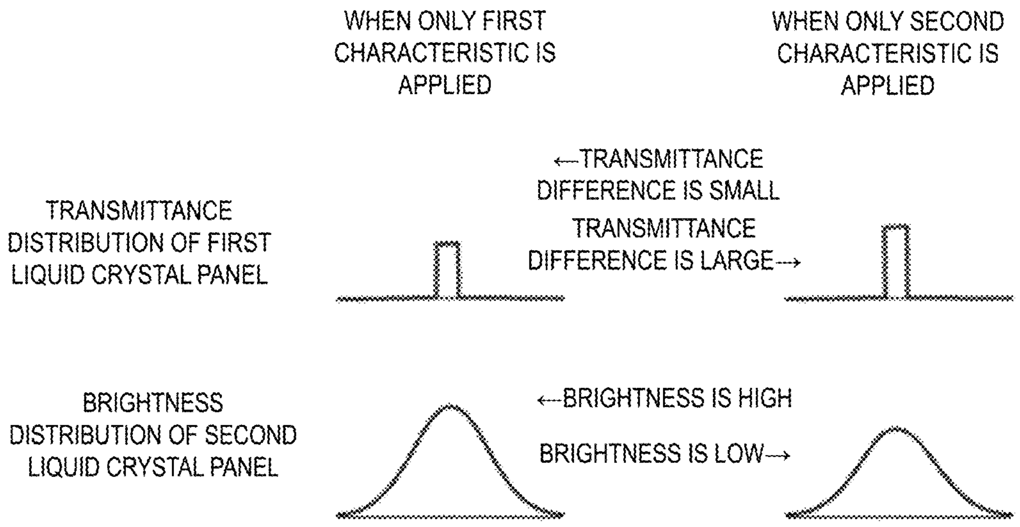
FIG. 6 is a diagram illustrating an example of a transmittance distribution of the first liquid crystal panel and a brightness distribution of the second liquid crystal panel when the dual-cell display is displaying an image including a background and an object.

FIG. 6 is a diagram illustrating an example of a transmittance distribution of the first liquid crystal panel 1 and a brightness distribution of the second liquid crystal panel 2 when the dual-cell display is displaying an image including the background 20 and the object 22. FIG. 6 illustrates each of a case where only the first characteristic 17 is applied and a case where only the second characteristic 18 is applied.

For each of the transmittance distribution of the first liquid crystal panel 1 and the brightness distribution of the second liquid crystal panel 2 illustrated in FIG. 6, a peak in the center corresponds to the object 22, and a position farther away from this peak corresponds to a position farther from the object 22 in the background 20.

When the image is displayed on the dual-cell display, the following can be said by comparing the case where only the first characteristic 17 is applied and the case where only the second characteristic 18 is applied. A fluctuation width of the transmittance distribution of the first liquid crystal panel 1 is greater in the case where only the second characteristic 18 is applied. A fluctuation width of the brightness distribution of the second liquid crystal panel 2 is greater in the case where only the first characteristic 17 is applied. In the dual-cell display, when the contrast of the first liquid crystal panel 1 is low, the brightness distribution of the second liquid crystal panel 2 significantly appears on the background 20. In the dual-cell display, even when the contrast of the first liquid crystal panel 1 is high, the brightness distribution of the second liquid crystal panel 2 may appear on the background 20. The same applies to the background 21. This results in the halo 23.

Figure 7:
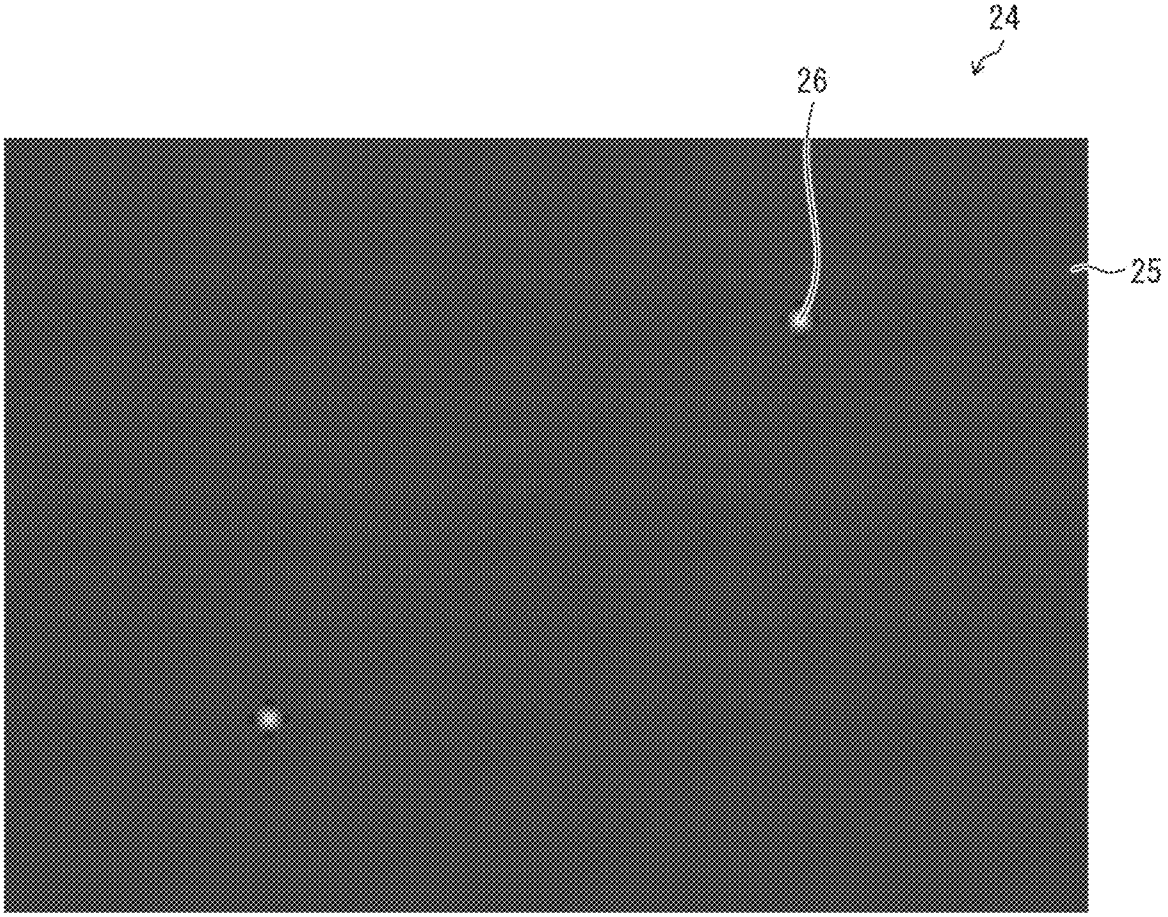
FIG. 7 is a diagram illustrating a second image.

FIG. 7 is a diagram illustrating a second image 24. The second image 24 includes an object 26 having a dot shape with a background 25 as a background of the second image 24. A target pixel value of the dual-cell display corresponding to the background 25 is "40", and a target pixel value of the dual-cell display corresponding to the object 26 is "255".

FIG. 8 is a table summarizing an image displayed by the first liquid crystal panel 1, an image displayed by the second liquid crystal panel 2, how the second image 24 is seen when the dual-cell display is observed from the front, and how the second image 24 is seen when the dual-cell display is observed from obliquely below, when a dual-cell display displays the second image 24. FIG. 8 illustrates each of a case where only the first characteristic 17 is applied and a case where only the second characteristic 18 is applied. FIG. 8 is illustrated based on calculation simulation. In FIG. 8, how the second image 24 is seen when the dual-cell display is observed from the front, and how the second image 24 is seen when the dual-cell display is observed from obliquely below are enhanced in contrast more than an actual image.

In a case where the second image 24 is displayed on the dual-cell display by applying only the first characteristic 17, the second liquid crystal panel 2 displays the background 25 in white. On the other hand, in a case where the second image 24 is displayed on the dual-cell display by applying only the second characteristic 18, the second liquid crystal panel 2 displays the background 25 in gray. As a result, in the case where the second image 24 is displayed on the dual-cell display by applying only the second characteristic 18, the background 25 is whitish only around the object 26 when the dual-cell display is observed from obliquely below. In FIG. 8, a portion where the background 25 is whitish is defined as an altered portion 27, and a combination of the object 26 and the altered portion 27 is defined as eyeball unevenness 28 because the combination looks like an eyeball.

Figure 9:
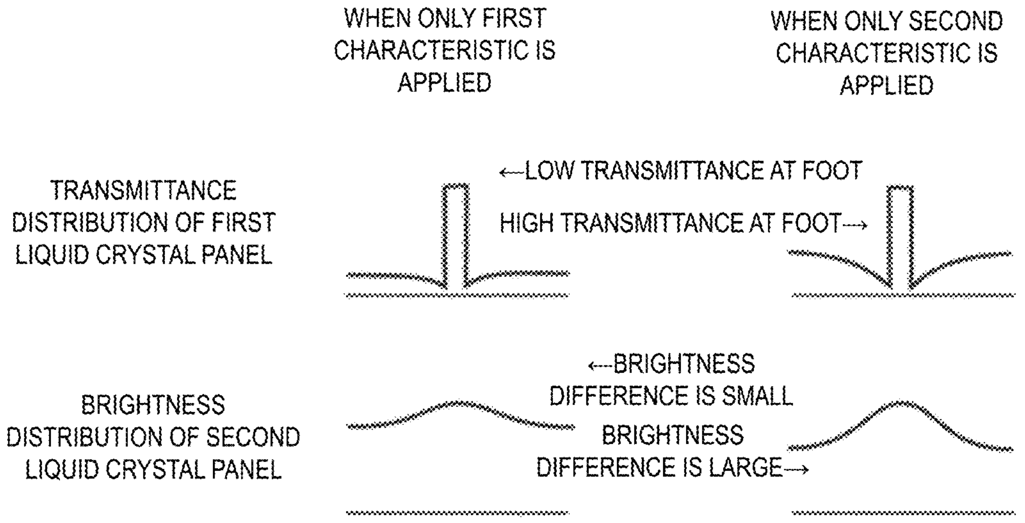
FIG. 9 is a diagram illustrating an example of a transmittance distribution of the first liquid crystal panel and a brightness distribution of the second liquid crystal panel when the dual-cell display is displaying the image including the background and the object.

FIG. 9 is a diagram illustrating an example of a transmittance distribution of the first liquid crystal panel 1 and a brightness distribution of the second liquid crystal panel 2 when the dual-cell display is displaying an image including the background 25 and the object 26. FIG. 9 illustrates each of a case where only the first characteristic 17 is applied and a case where only the second characteristic 18 is applied.

For each of the transmittance distribution of the first liquid crystal panel 1 and the brightness distribution of the second liquid crystal panel 2 illustrated in FIG. 9, a peak in the center corresponds to the object 26, and a position farther away from this peak corresponds to a position farther from the object 26 in the background 25.

When the image is displayed on the dual-cell display, the following can be said by comparing the case where only the first characteristic 17 is applied and the case where only the second characteristic 18 is applied. A transmittance of the first liquid crystal panel 1 at a foot (corresponding to a position that is far enough from the object 26 in the background 25) of the transmittance distribution of the first liquid crystal panel 1 is greater in the case where only the second characteristic 18 is applied. A fluctuation width of the brightness distribution of the second liquid crystal panel 2 is greater in the case where only the second characteristic 18 is applied. In the dual-cell display, a periphery of the object 26 in the background 25 is blackish and easy to see, while the object 26 is whitish and easy to see. This results in the eyeball unevenness 28.

From the above description, it can be seen that the dual-cell display has a risk of displaying the killer pattern (an image including the halo 23 or the eyeball unevenness 28). The display device 101 is the dual-cell display, in which the risk of displaying the killer pattern is reduced.

The controller 15 determines, based on a maximum value of the target pixel value of the display device 101 and surrounding pixel values of the display device 101 and a minimum value of the target pixel value of the display device 101 and the surrounding pixel values of the display device 101, the value of the gray scale of the target pixel of the second liquid crystal panel 2 with reference to at least one of the first characteristic 17 and the second characteristic 18 indicating characteristics different from each other as characteristics for converting the target pixel value of the display device 101 into the value of the gray scale of the target pixel of the second liquid crystal panel 2.

In particular, the controller 15 according to the first embodiment of the disclosure determines the value of the gray scale of the target pixel of the second liquid crystal panel 2 with reference to the second characteristic 18 when the maximum value is less than a predetermined value, and when a difference between the maximum value and the minimum value is greater than 0, and the controller determines the value of the gray scale of the target pixel of the second liquid crystal panel 2 with reference to the first characteristic 17 when the maximum value is equal to or greater than the predetermined value, or when the difference is 0.

Figure 10:
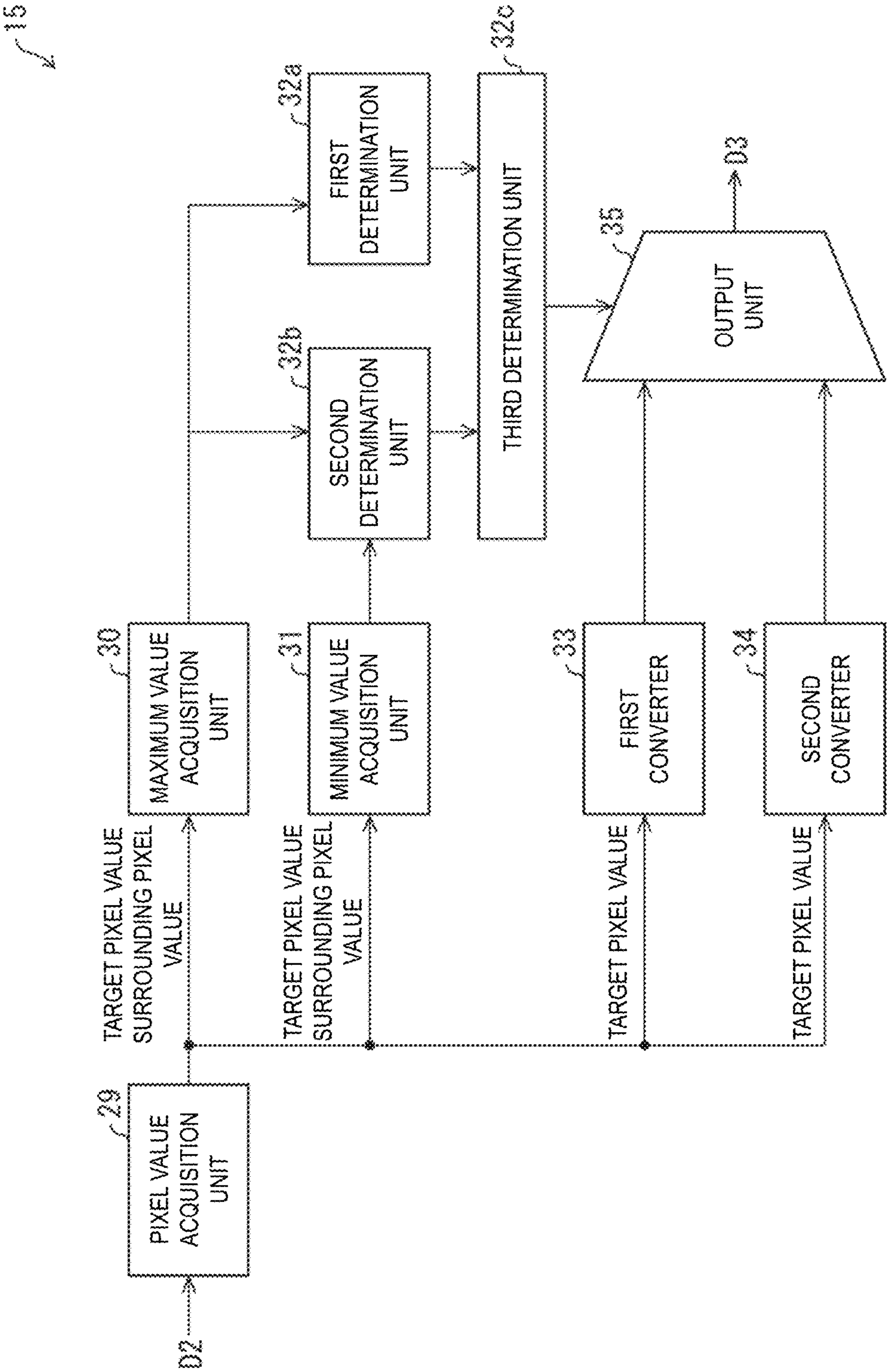
FIG. 10 is a schematic diagram of a controller according to a first embodiment of the disclosure.

FIG. 10 is a schematic diagram of the controller 15 according to the first embodiment of the disclosure. The controller 15 includes a pixel value acquisition unit 29, a maximum value acquisition unit 30, a minimum value acquisition unit 31, a first determination unit 32*a*, a second determination unit 32*b*, a third determination unit 32*c*, a first converter 33, a second converter 34, and an output unit 35. The controller 15 may be hardware implemented by a field-programmable gate array (FPGA), an application-specific integrated circuit (ASIC), or the like, or may be software implemented by a central processing unit (CPU). The first converter 33 converts the target pixel value of the display device 101 into the value of the gray scale of the target pixel of the second liquid crystal panel 2 with reference to the first characteristic 17. The second converter 34 converts the target pixel value of the display device 101 into the value of the gray scale of the target pixel of the second liquid crystal panel 2 with reference to the second characteristic 18.

Figure 11:
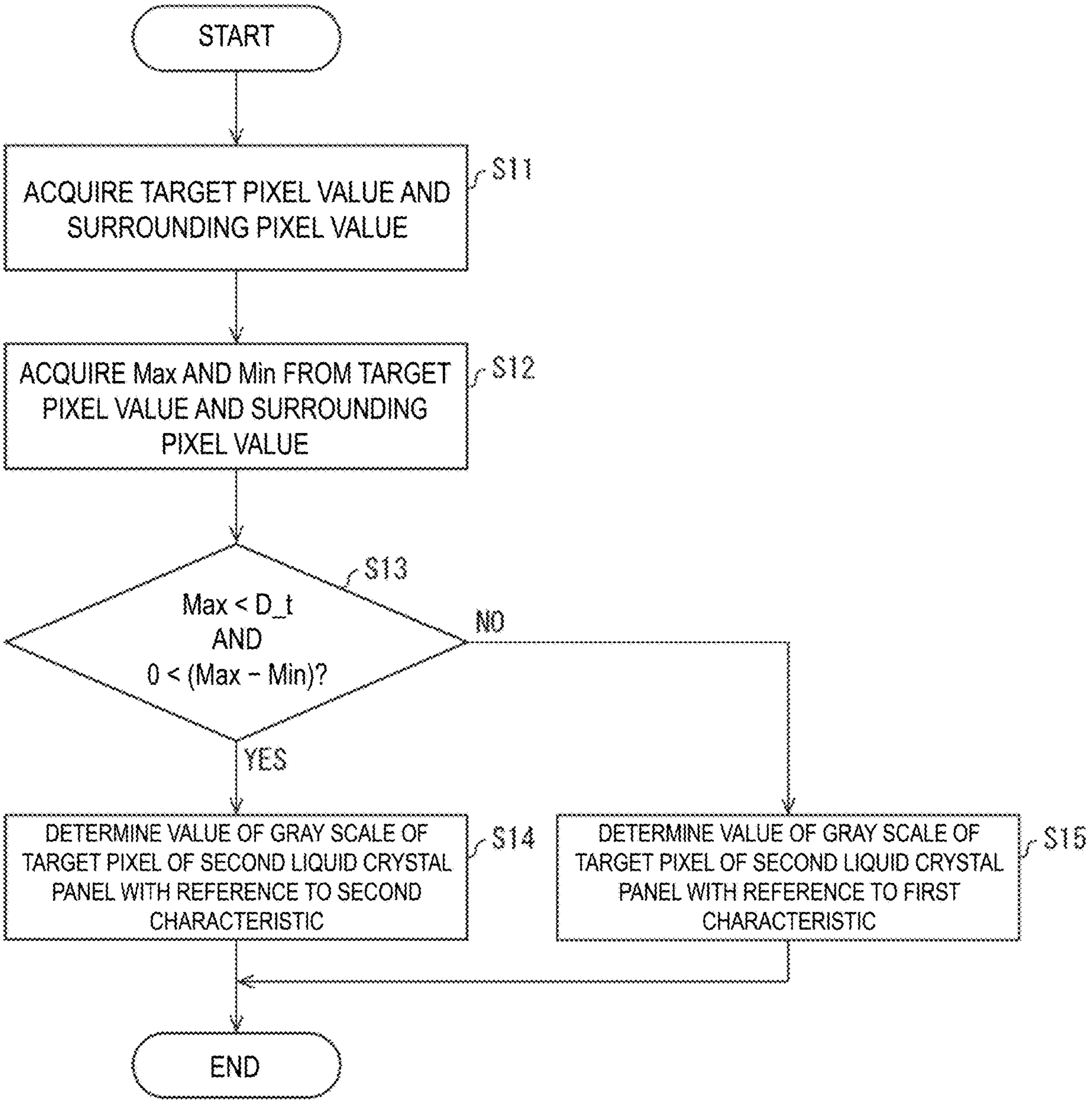
FIG. 11 is a flowchart illustrating a flow of operation of the controller according to the first embodiment of the disclosure.

FIG. 11 is a flowchart illustrating a flow of operation of the controller 15 according to the first embodiment of the disclosure. As illustrated in FIG. 11, the operation of the controller 15 according to the first embodiment of the disclosure includes steps S11 to S15.

In step S11, the pixel value acquisition unit 29 acquires the target pixel value of the display device 101 and the surrounding pixel values of the display device 101 from the second image data D2.

Figure 12:
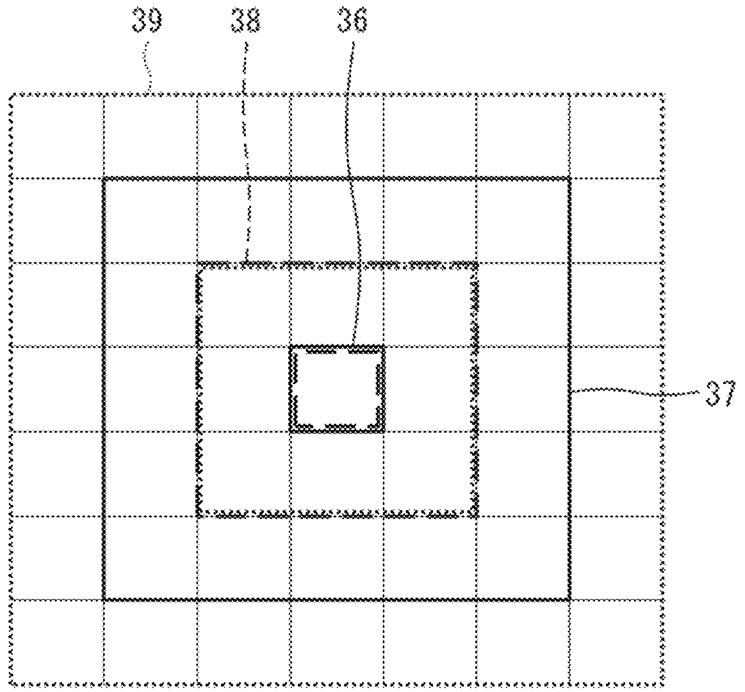
FIG. 12 is an image diagram illustrating a target pixel and surrounding pixels of the display device according to the disclosure.

FIG. 12 is an image diagram illustrating the target pixel and the surrounding pixels of the display device 101. When the target pixel of the display device 101 is a pixel 36, the surrounding pixels of the display device 101 is at least one pixel 37 of the display device 101 located around the target pixel 36. Here, at least one pixel of the surrounding pixels of the display device 101 is not limited to a pixel adjacent to the pixel 36 (belonging to a pixel group 38 in FIG. 12), and may be a pixel that is away from the pixel 36 by one or more pixels (belonging to a pixel group 39 in FIG. 12).

In step S12, the maximum value acquisition unit 30 acquires a maximum value Max of the target pixel value of the display device 101 and the surrounding pixel values of the display device 101. In step S12, the minimum value acquisition unit 31 acquires a minimum value Min of the target pixel value of the display device 101 and the surrounding pixel values of the display device 101.

In step S13, the first determination unit 32*a* determines whether the maximum value Max is less than a predetermined value D_t. In step S13, the second determination unit 32*b* determines whether a difference (Max−Min) between the maximum value Max and the minimum value Min is greater than 0. In step S13, the third determination unit 32*c* determines whether the determination result of the first determination unit 32*a* is YES (the maximum value Max is less than the predetermined value D_t), and the determination result of the second determination unit 32*b* is YES (the difference (Max−Min) is greater than 0). The determination result of the third determination unit 32*c* is defined as a determination result of the entire step S13.

If the determination result in step S13 is YES, then step S14 is performed. In step S14, the output unit 35 acquires a conversion result by the second converter 34, thus determining the value of the gray scale of the target pixel of the second liquid crystal panel 2 with reference to the second characteristic 18, and outputs the value as the third image data D3.

If the determination result in step S13 is NO, then step S15 is performed. In step S15, the output unit 35 acquires a conversion result by the first converter 33, thus determining the value of the gray scale of the target pixel of the second liquid crystal panel 2 with reference to the first characteristic 17, and outputs the value as the third image data D3.

Figure 13:
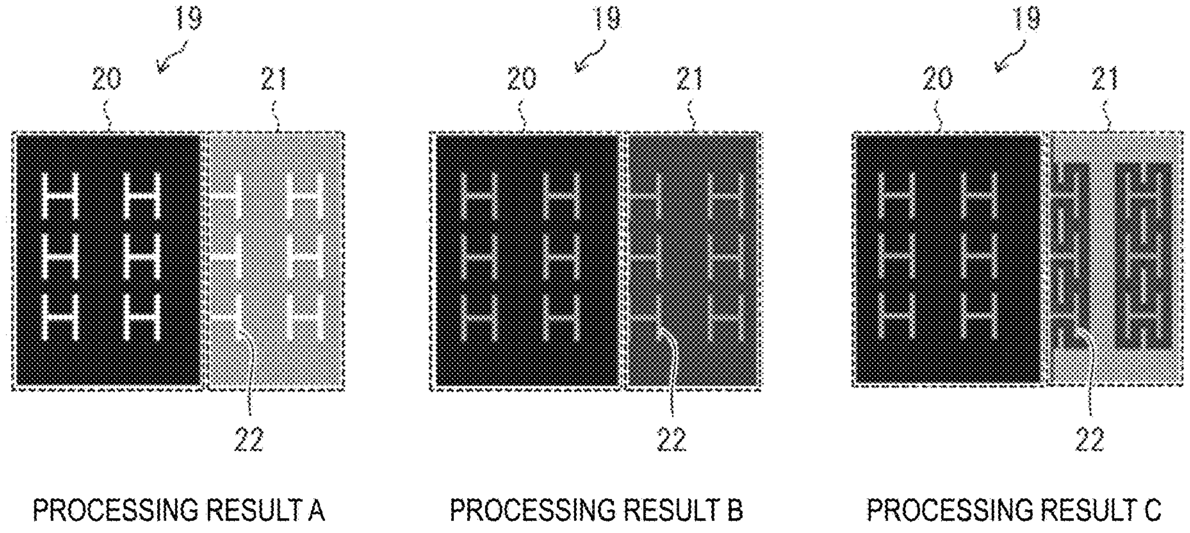
FIG. 13 is a diagram illustrating processing results of the first image.

FIG. 13 is a diagram illustrating processing results of the first image 19. In FIG. 13, contrast is enhanced more than it actually is. FIG. 13 illustrates, starting from left, a processing result (processing result A) with reference to only the first characteristic 17, a processing result (processing result B) with reference to only the second characteristic 18, and a processing result (processing result C) with reference to both the first characteristic 17 and the second characteristic 18 by an action of the controller 15 according to the first embodiment of the disclosure.

The following can be said for the processing result C. The predetermined value D_t is assumed to be "64". Since the maximum value Max is "32" at most, the maximum value Max is less than the predetermined value D_t. Accordingly, a boundary between the background 21 and the object 22, where the difference is greater than 0, is processed with reference to the second characteristic 18, and a portion other than the boundary in the background 21, where the difference is 0, is processed with reference to the first characteristic 17. As a result, the second liquid crystal panel 2 displays the boundary in low gray scale as compared with the portion other than the boundary in the background 21.

Figure 14:
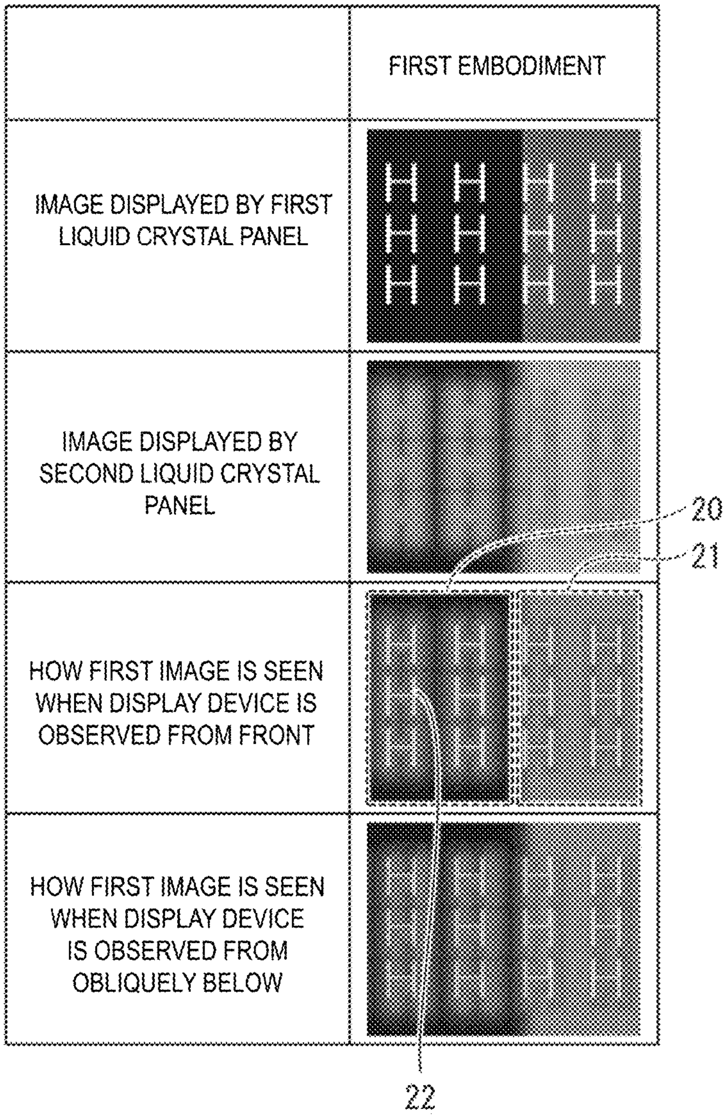
FIG. 14 is a table summarizing an image displayed by the first liquid crystal panel, an image displayed by the second liquid crystal panel, how the first image is seen when the display device is observed from the front, and how the first image is seen when the display device is observed from obliquely below, when the display device according to the first embodiment of the disclosure displays the first image.

FIG. 14 is a table summarizing an image displayed by the first liquid crystal panel 1, an image displayed by the second liquid crystal panel 2, how the first image 19 is seen when the display device 101 is observed from the front, and how the first image 19 is seen when the display device 101 is observed from obliquely below, when the display device 101 according to the first embodiment of the disclosure displays the first image 19. FIG. 14 is defined corresponding to FIG. 5. According to FIG. 14, it can be seen that the halo 23 around the object 22 is improved when observing the display device 101 from the front.

Figure 15:
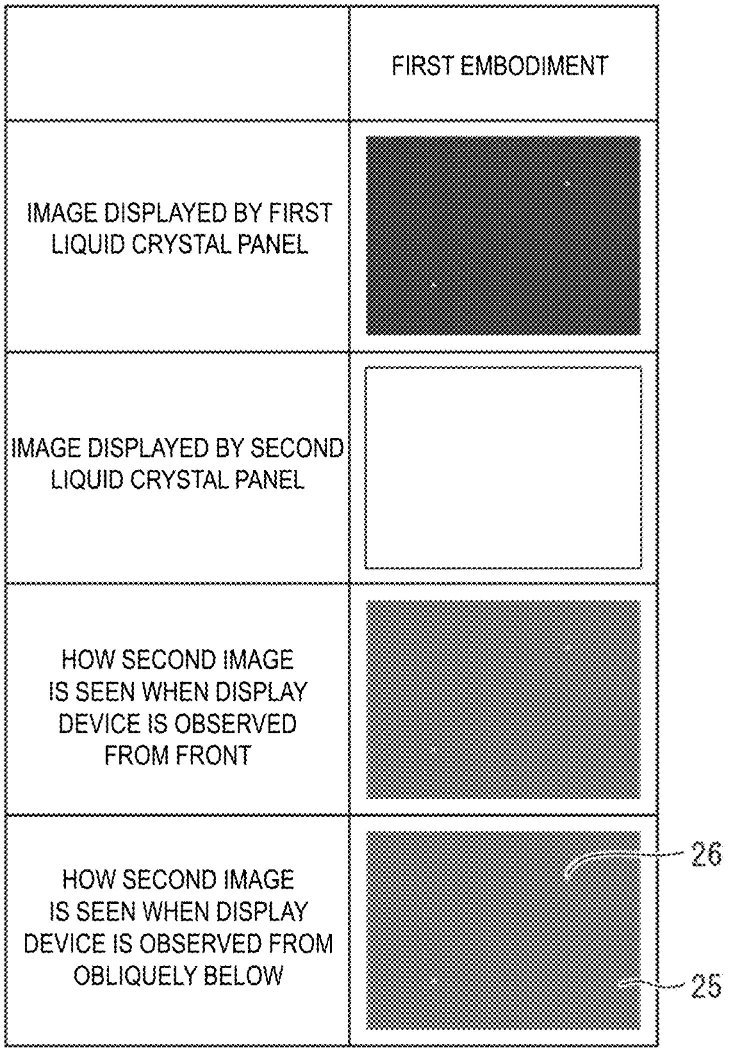
FIG. 15 is a table summarizing an image displayed by the first liquid crystal panel, an image displayed by the second liquid crystal panel, how the second image is seen when the display device is observed from the front, and how the second image is seen when the display device is observed from obliquely below, when the display device according to the first embodiment of the disclosure displays the second image.

FIG. 15 is a table summarizing an image displayed by the first liquid crystal panel 1, an image displayed by the second liquid crystal panel 2, how the second image 24 is seen when the display device 101 is observed from the front, and how the second image 24 is seen when the display device 101 is observed from obliquely below, when the display device 101 according to the first embodiment of the disclosure displays the second image 24. FIG. 15 is defined corresponding to FIG. 8. According to FIG. 15, when the display device 101 is observed from obliquely below, it can be seen that the eyeball unevenness 28 is improved.

According to the display device 101 according to the first embodiment of the disclosure, the display device, in which the risk of displaying the killer pattern generated by above-described mechanism is reduced, can be achieved.

Second Embodiment

Examples of the mechanism in which the killer pattern is displayed in the display device 101 according to the first embodiment of the disclosure will now be described.

Figure 16:
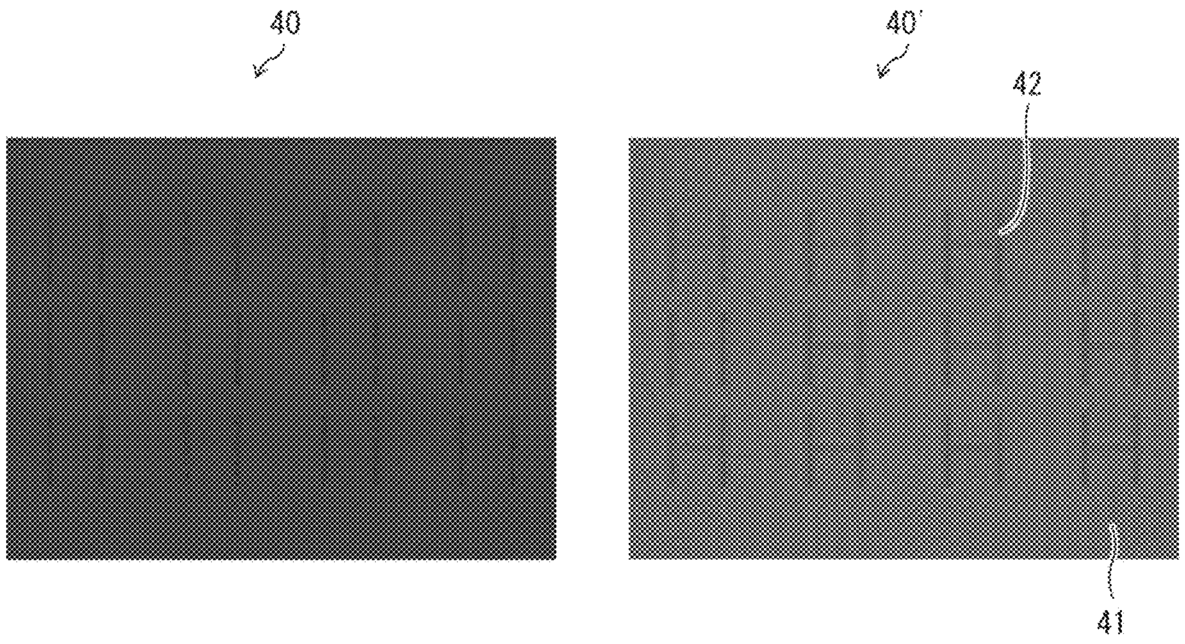
FIG. 16 is a diagram illustrating a third image.

FIG. 16 is a diagram illustrating a third image 40. A third image 40' is obtained by enhancing contrast of the third image 40. According to the third image 40', the third image 40 includes an object 42 with a background 41 as a background of the third image 40. A target pixel value of the display device 101 corresponding to the background 41 is "40", and a target pixel value of the display device 101 corresponding to the object 42 is "32".

Figure 17:
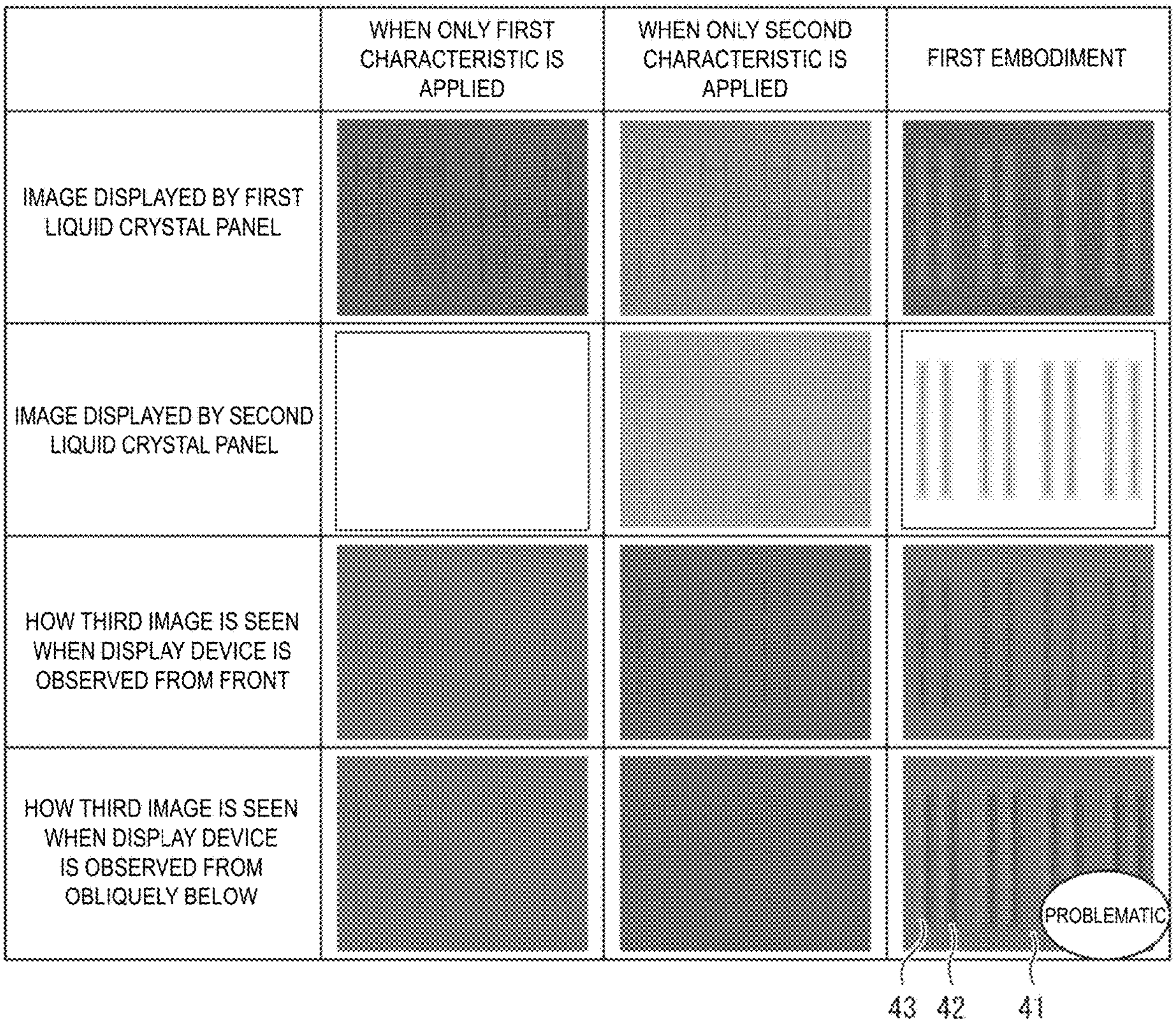
FIG. 17 is a table summarizing an image displayed by the first liquid crystal panel, an image displayed by the second liquid crystal panel, how the third image is seen when the display device is observed from the front, and how the third image is seen when the display device is observed from obliquely below, when the display device according to the first embodiment of the disclosure displays the third image.

FIG. 17 is a table summarizing an image displayed by the first liquid crystal panel 1, an image displayed by the second liquid crystal panel 2, how the third image 40 is seen when the display device 101 is observed from the front, and how the third image 40 is seen when the display device 101 is observed from obliquely below, when the display device 101 according to the first embodiment of the disclosure displays the third image 40. FIG. 17 illustrates each of a case where only the first characteristic 17 is applied, a case where only the second characteristic 18 is applied, and a case where both the first characteristic 17 and the second characteristic 18 are applied by an action of the controller 15 according to the first embodiment of the disclosure. FIG. 17 is illustrated based on calculation simulation. In FIG. 17, the image displayed by the first liquid crystal panel 1, how the third image 40 is seen when the display device 101 is observed from the front, and how the third image 40 is seen when the display device 101 is observed from obliquely below are enhanced in contrast more than an actual image.

According to FIG. 17, when the third image 40 is displayed on the display device 101 according to the first embodiment of the disclosure, a halo 43 is generated around the object 42 when the display device 101 is observed from obliquely below.

From the above description, it can be seen that the display device 101 according to the first embodiment of the disclosure has a risk of displaying the killer pattern (an image including the halo 43). The display device 101 according to the second embodiment of the disclosure reduces the risk of displaying the killer pattern as compared with the display device 101 according to the first embodiment of the disclosure.

The controller 15 according to the second embodiment of the disclosure determines the value of the gray scale of the target pixel of the second liquid crystal panel 2 by the following formula:

$$(1-\text{Min}/\text{Max})\times P2+(\text{Min}/\text{Max})\times P1,$$

where the maximum value of the target pixel value of the display device 101 and the surrounding pixel values of the display device 101 is Max, the minimum value of the target pixel value of the display device 101 and the surrounding pixel values of the display device 101 is Min, the value of the gray scale of the target pixel of the second liquid crystal panel 2 determined with reference to only the first characteristic 17 is P1, the value of the gray scale of the target pixel of the second liquid crystal panel 2 determined with reference to only the second characteristic 18 is P2.

Figure 18:
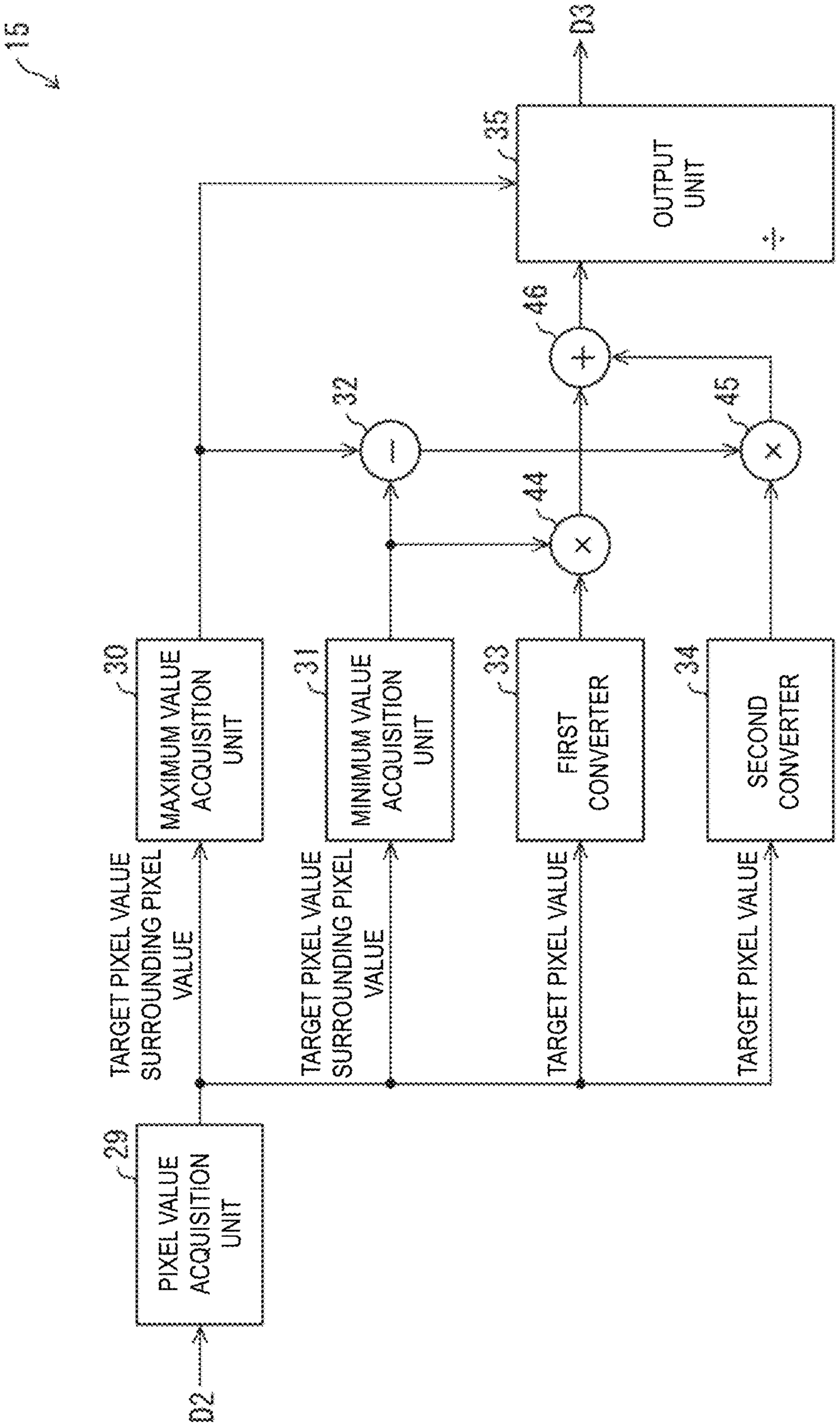
FIG. 18 is a schematic diagram of a controller according to a second embodiment of the disclosure.

FIG. 18 is a schematic diagram of the controller 15 according to the second embodiment of the disclosure. The controller 15 includes the pixel value acquisition unit 29, the maximum value acquisition unit 30, the minimum value acquisition unit 31, a subtraction unit 32, the first converter 33, the second converter 34, the output unit 35, multiplication units 44 and 45, and an addition unit 46.

Figure 19:
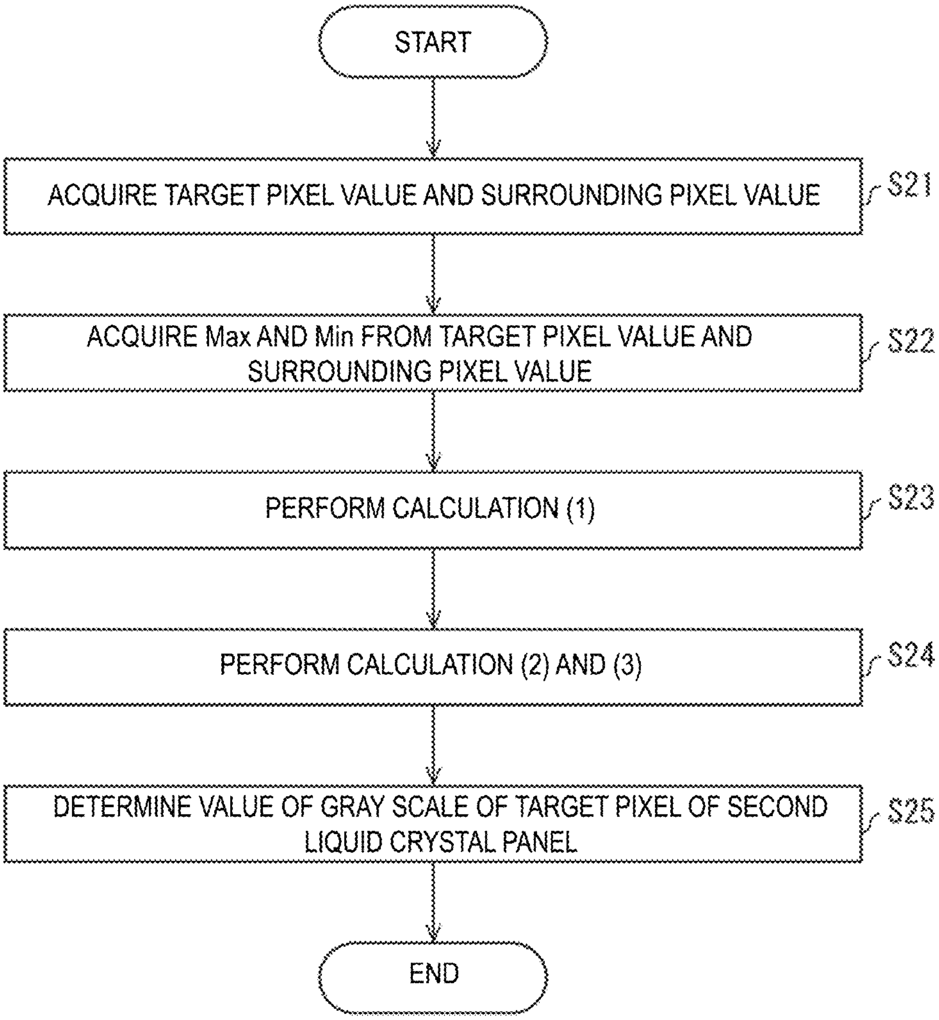
FIG. 19 is a flowchart illustrating a flow of operation of the controller according to the second embodiment of the disclosure.

FIG. 19 is a flowchart illustrating a flow of operation of the controller 15 according to the second embodiment of the disclosure. As illustrated in FIG. 19, the operation of the controller 15 according to the second embodiment of the disclosure includes steps S21 to S25.

In step S21, the pixel value acquisition unit 29 acquires the target pixel value of the display device 101 and the surrounding pixel values of the display device 101 from the second image data D2.

In step S22, the maximum value acquisition unit 30 acquires the maximum value Max of the target pixel value of the display device 101 and the surrounding pixel values of the display device 101. In step S22, the minimum value acquisition unit 31 acquires the minimum value Min of the target pixel value of the display device 101 and the surrounding pixel values of the display device 101. Here, a value of the maximum value Max is denoted as Max, and a value of the minimum value Min is denoted as Min.

In step S23, the multiplication unit 44 acquires a conversion result by the first converter 33, and performs calculation (1).

$$\text{Min}\times P1 \tag{1}$$

In step S24, the subtraction unit 32 performs calculation (2). In step S24, the multiplication unit 45 acquires a conversion result by the second converter 34, and performs calculation (3).

$$\text{Max}-\text{Min} \tag{2}$$

$$(\text{Max}-\text{Min})\times P2 \tag{3}$$

Where P1 corresponds to an output of the first converter 33 when the target pixel value of the display device 101 is an input of the first converter 33. Note that P2 corresponds to an output of the second converter 34 when the target pixel value of the display device 101 is an input of the second converter 34.

In step S25, the addition unit 46 adds the result of the calculation (1) and the result of the calculation (3), in other words, performs calculation (4).

$$\{(\text{Max}-\text{Min})\times P2\}+(\text{Min}\times P1) \tag{4}$$

In step S25, the output unit 35 divides the result of calculation (4) by Max, determines the value of the gray scale of the target pixel of the second liquid crystal panel 2, and outputs the value as the third image data D3. It is not necessary to divide the result of calculation (4) by Max.

Figure 20:
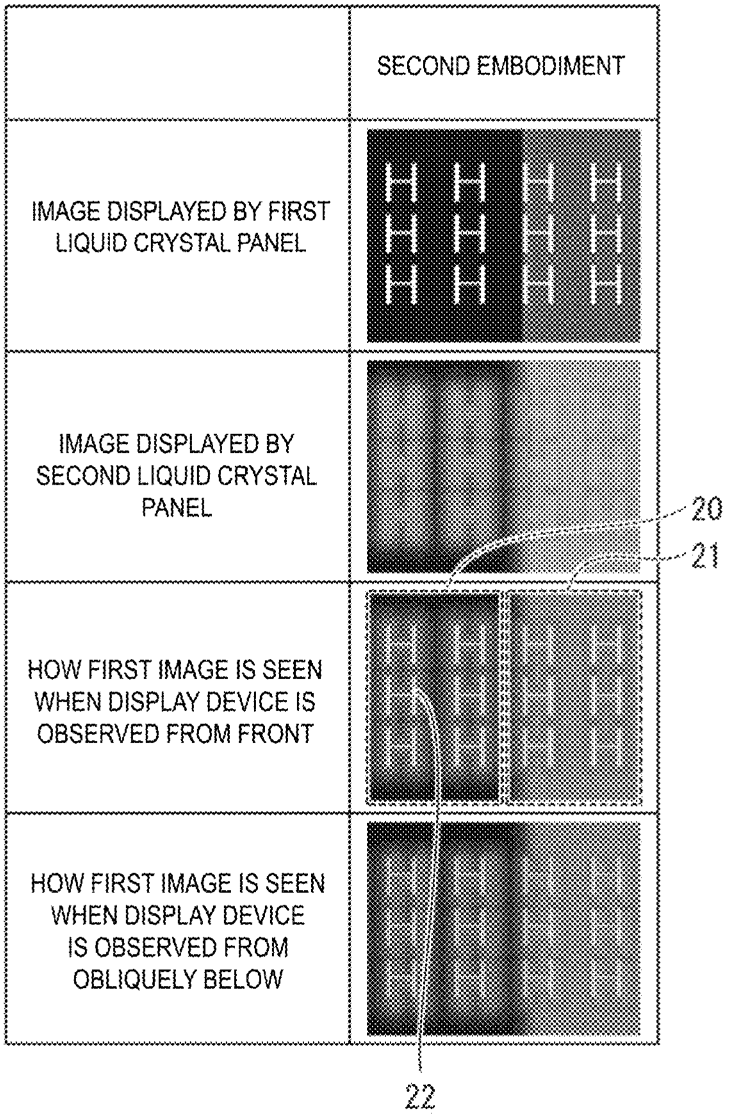
FIG. 20 is a table summarizing an image displayed by the first liquid crystal panel, an image displayed by the second liquid crystal panel, how the first image is seen when the display device is observed from the front, and how the first image is seen when the display device is observed from obliquely below, when the display device according to the second embodiment of the disclosure displays the first image.

FIG. 20 is a table summarizing an image displayed by the first liquid crystal panel 1, an image displayed by the second liquid crystal panel 2, how the first image 19 is seen when the display device 101 is observed from the front, and how the first image 19 is seen when the display device 101 is observed from obliquely below, when the display device 101 according to the second embodiment of the disclosure displays the first image 19. FIG. 20 is defined corresponding to FIG. 5. According to FIG. 20, it can be seen that the halo 23 around the object 22 is improved when observing the display device 101 from the front.

Figure 21:
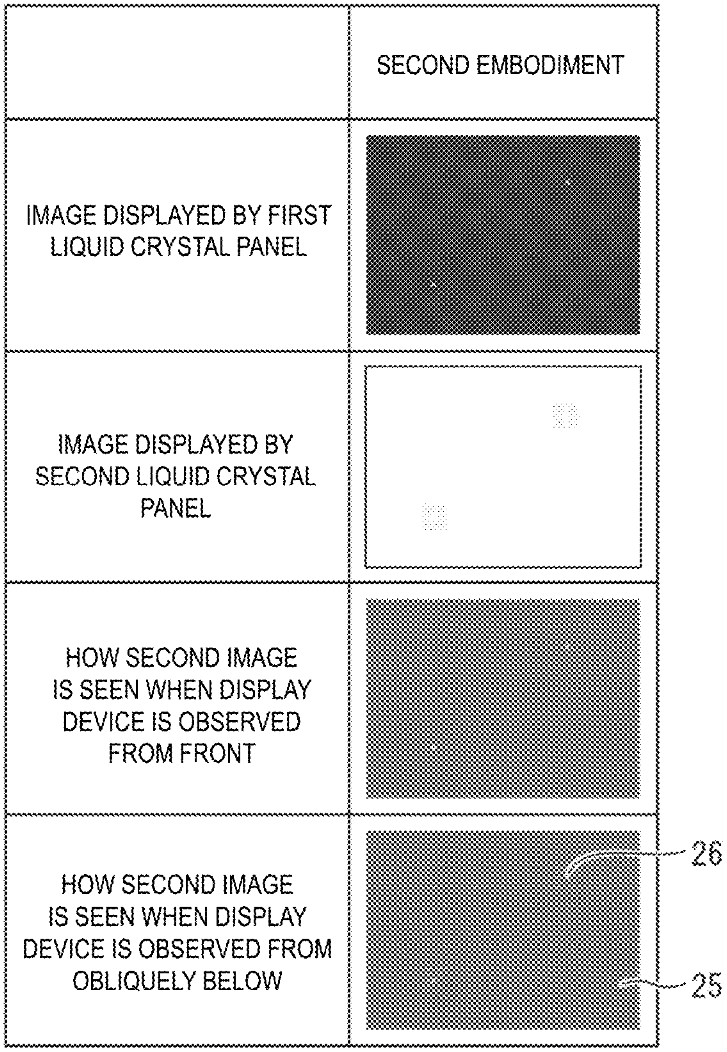
FIG. 21 is a table summarizing an image displayed by the first liquid crystal panel, an image displayed by the second liquid crystal panel, how the second image is seen when the display device is observed from the front, and how the second image is seen when the display device is observed from obliquely below, when the display device according to the second embodiment of the disclosure displays the second image.

FIG. 21 is a table summarizing an image displayed by the first liquid crystal panel 1, an image displayed by the second liquid crystal panel 2, how the second image 24 is seen when the display device 101 is observed from the front, and how the second image 24 is seen when the display device 101 is observed from obliquely below, when the display device 101 according to the second embodiment of the disclosure displays the second image 24. FIG. 21 is defined corresponding to FIG. 8. According to FIG. 21, it can be seen that the eyeball unevenness 28 is improved when the display device 101 is observed from obliquely below.

Figure 22:
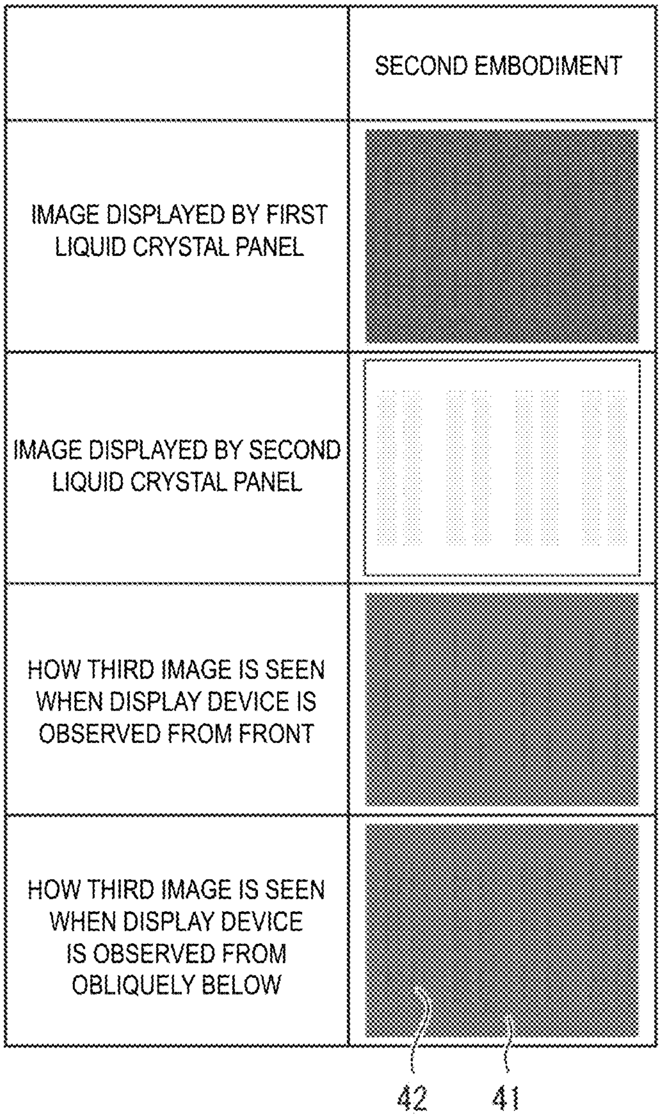
FIG. 22 is a table summarizing an image displayed by the first liquid crystal panel, an image displayed by the second liquid crystal panel, how the third image is seen when the display device is observed from the front, and how the third image is seen when the display device is observed from obliquely below, when the display device according to the second embodiment of the disclosure displays the third image.

FIG. 22 is a table summarizing an image displayed by the first liquid crystal panel 1, an image displayed by the second liquid crystal panel 2, how the third image 40 is seen when the display device 101 is observed from the front, and how the third image 40 is seen when the display device 101 is observed from obliquely below, when the display device 101 according to the second embodiment of the disclosure displays the third image 40. FIG. 22 is defined corresponding to FIG. 17. According to FIG. 22, it can be seen that the halo 43 is improved when the display device 101 is observed from obliquely below.

The controller 15 of the display device 101 according to the second embodiment of the disclosure is a specific example of a configuration in which a ratio of a component corresponding to the second characteristic 18 in the value of the gray scale of the target pixel of the second liquid crystal panel 2 is increased as the difference (Max−Min) between the maximum value Max and the minimum value Min increases. In other words, weight of the reference of the second characteristic 18 to a sum of the reference of the first characteristic 17 and the reference of the second characteristic 18 is increased as the difference (Max−Min) increases.

Third Embodiment

The controller 15 may generate the first characteristic 17 based on a product of the value of the gray scale of the target pixel of the second liquid crystal panel 2 determined with reference to only the second characteristic 18 and a predetermined coefficient of one or more.

When the product is equal to or greater than an upper limit value of the gray scale of the target pixel of the second liquid crystal panel 2, the controller 15 may sets the upper limit value as the value of the gray scale of the target pixel of the second liquid crystal panel 2 determined with reference to only the first characteristic 17.

Figure 23:
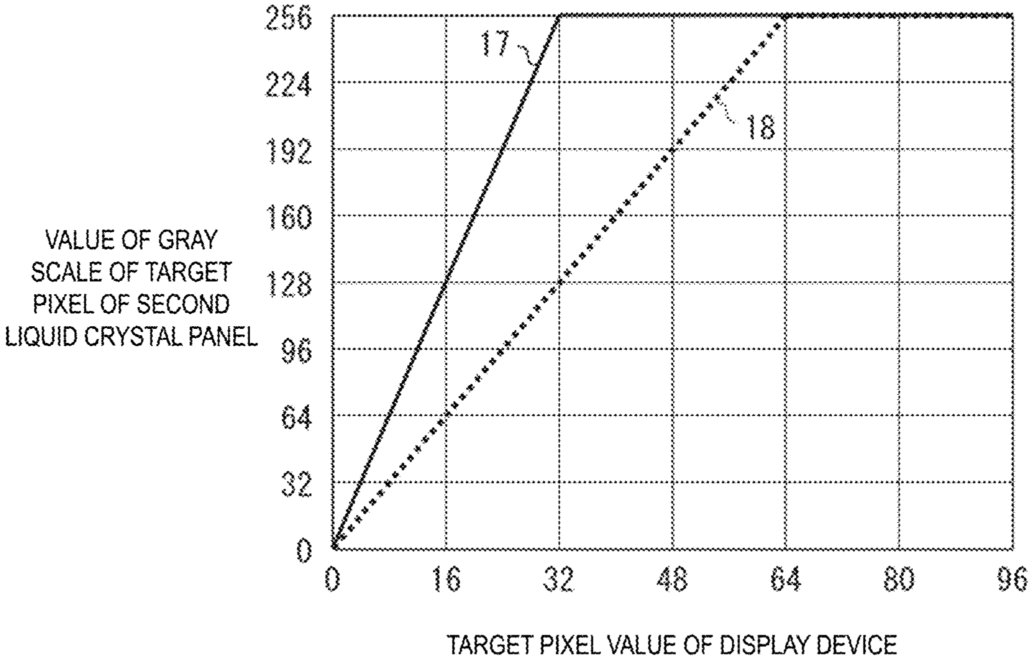
FIG. 23 is a graph showing an example of a second characteristic and a first characteristic generated by the controller.

FIG. 23 is a graph showing an example of the second characteristic 18 and the first characteristic 17 generated by the controller 15. The controller 15 determines whether a product of the value of the gray scale of the target pixel of the second liquid crystal panel 2 determined with reference to only the second characteristic 18 and a predetermined coefficient of one or more α (here, α=2) is equal to or greater than the upper limit value "255" of the gray scale of the target pixel of the second liquid crystal panel 2. The controller 15 sets the value of the gray scale of the target pixel of the second liquid crystal panel 2 determined with reference to only the first characteristic 17 to a product when the product is less than "255" and to "255" when the product is equal to or greater than "255". Thus, the controller 15 may generate the first characteristic 17.

APPENDIX

A function of the display device 101 (hereinafter referred to as "device") can be achieved by a program for causing a computer to function as each control block (in particular, each unit included in the controller 15) of the device.

In this case, the device includes a computer including at least one control device (for example, a processor) and at least one storage device (for example, a memory), as hardware for executing the program. By executing the program by using the control device and the storage device, each function described in the above-described each embodiment is achieved.

The program may be stored in a non-transitory and computer readable one or a plurality of storage media. The device described above may include or need not include the storage medium. In the latter case, the program may be supplied to the device via an any wired or wireless transmission medium.

Furthermore, some or all of the functions of each of the control blocks can be implemented by a logic circuit. For example, an integrated circuit, in which a logic circuit functioning as each of the control blocks described above is formed, is also included within the scope of the disclosure. In addition, it is also possible to implement the function of each of the control blocks described above by, for example, quantum computers.

The control method corresponding to the operation of the controller 15 of the display device 101 is also included within the scope of the disclosure. That is, the following can be said.

The control method of the display device 101 is a control method of the display device 101 including the first liquid crystal panel 1 and the second liquid crystal panel 2 disposed on the back face of the first liquid crystal panel 1. The control method of the display device 101 determines, based on a maximum value of the target pixel value of the display device 101 and surrounding pixel values of the display device 101 and a minimum value of the target pixel value of the display device 101 and the surrounding pixel values of the display device 101, the value of the gray scale of the target pixel of the second liquid crystal panel 2 with reference to at least one of the first characteristic 17 and the second characteristic 18 indicating characteristics different from each other as characteristics for converting the target pixel value of the display device 101 into the value of the gray scale of the target pixel of the second liquid crystal panel 2.

SUPPLEMENT

A display device according to a first aspect of the disclosure includes a first liquid crystal panel, a second liquid crystal panel disposed on a back face of the first liquid crystal panel, and a controller, in which the controller determines, based on a maximum value of a target pixel value of the display device and a surrounding pixel value of the display device and a minimum value of the target pixel value and the surrounding pixel value, a value of a gray scale of a target pixel of the second liquid crystal panel with reference to at least one of a plurality of conversion characteristics indicating characteristics different from each other as characteristics configured to convert the target pixel value into the value of the gray scale of the target pixel of the second liquid crystal panel.

In a display device according to a second aspect of the disclosure, in the first aspect, the plurality of conversion characteristics include a first characteristic and a second characteristic, and when the target pixel values are identical, a value of the gray scale of the target pixel of the second liquid crystal panel determined with reference to only the first characteristic is equal to or more than a value of the gray scale of the target pixel of the second liquid crystal panel determined with reference to only the second characteristic.

In a display device according to a third aspect of the disclosure, in the second aspect, the controller determines the value of the gray scale of the target pixel of the second liquid crystal panel with reference to the second characteristic when the maximum value is less than a predetermined value, and when a difference between the maximum value and the minimum value is greater than 0, and the controller determines the value of the gray scale of the target pixel of the second liquid crystal panel with reference to the first characteristic when the maximum value is equal to or greater than the predetermined value, or when the difference is 0.

In a display device according to a fourth aspect of the disclosure, in the second aspect, the controller increases a ratio of a component corresponding to the second characteristic in the value of the gray scale of the target pixel of the second liquid crystal panel as a difference between the maximum value and the minimum value increases.

In a display device according to a fifth aspect of the disclosure, in the second aspect, the controller determines the value of the gray scale of the target pixel of the second liquid crystal panel by a formula below $$(1-\mathrm{Min}/\mathrm{Max})\times P2+(\mathrm{Min}/\mathrm{Max})\times P1,$$

where the maximum value is Max, the minimum value is Min, the value of the gray scale of the target pixel of the second liquid crystal panel determined with reference to only the first characteristic is P1, the value of the gray scale of the target pixel of the second liquid crystal panel determined with reference to only the second characteristic is P2.

In a display device according to a sixth aspect of the disclosure, in any one of the second to the fifth aspects, the controller generates the first characteristic based on a product of the value of the gray scale of the target pixel of the second liquid crystal panel determined with reference to only the second characteristic and a predetermined coefficient of one or more.

In a display device according to a seventh aspect of the disclosure, in the sixth aspect, when the product is equal to or greater than an upper limit value of the gray scale of the target pixel of the second liquid crystal panel, the controller sets the upper limit value as the value of the gray scale of the target pixel of the second liquid crystal panel determined with reference to only the first characteristic.

A display device according to an eighth aspect of the disclosure, in any one of the first to the seventh aspects, further includes a downsampling unit configured to perform downsampling on first image data to generate second image data including the target pixel value and the surrounding pixel value, and to supply the second image data to the controller.

A display device according to a ninth aspect of the disclosure, in any one of the first to the eighth aspects, further includes an image extension unit configured to perform image extension processing on output data from the controller.

A control method of a display device according to a tenth aspect is a control method of a display device including a first liquid crystal panel and a second liquid crystal panel disposed on a back face of the first liquid crystal panel, the control method including determining, based on a maximum value of a target pixel value of the display device and a surrounding pixel value of the display device and a minimum value of the target pixel value and the surrounding pixel value, a value of a gray scale of a target pixel of the second liquid crystal panel with reference to at least one of a plurality of conversion characteristics indicating characteristics different from each other as characteristics configured to convert the target pixel value into the value of the gray scale of the target pixel of the second liquid crystal panel.

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in each of the embodiments.

While there have been described what are at present considered to be certain embodiments of the application, it will be understood that various modifications may be made thereto, and it is intended that the appended claim cover all such modifications as fall within the true spirit and scope of the application.

The invention claimed is:

1. A display device comprising:
- a first liquid crystal panel;
- a second liquid crystal panel disposed on a back face of the first liquid crystal panel; and
- a controller,
- wherein the controller determines, based on a maximum value of a target pixel value of the first liquid crystal panel and/or the second liquid crystal panel and a surrounding pixel value of the first liquid crystal panel and/or the second liquid crystal panel and a minimum value of the target pixel value and the surrounding pixel value, a value of a gray scale of a target pixel of the second liquid crystal panel with reference to at least one of a plurality of conversion characteristics indicating characteristics different from each other configured to convert the maximum value of the target pixel value or the minimum value of the target pixel value into the value of the gray scale of the target pixel of the second liquid crystal panel,
- wherein the plurality of conversion characteristics includes a first characteristic and a second characteristic, and
- wherein, when the maximum value of the target pixel value and the minimum value of the target pixel value are identical, a value of the gray scale of the target pixel of the second liquid crystal panel determined with reference to only the first characteristic is equal to or more than a value of the gray scale of the target pixel of the second liquid crystal panel determined with reference to only the second characteristic.

2. The display device according to claim 1,
- wherein the controller further determines the value of the gray scale of the target pixel of the second liquid crystal panel with reference to only the second characteristic when the maximum value of the target pixel value is less than a predetermined value, and a difference between the maximum value of the target pixel value and the minimum value of the target pixel value is greater than 0, and
- wherein the controller further determines the value of the gray scale of the target pixel of the second liquid crystal panel with reference to only the first characteristic when the maximum value of the target pixel value is equal to or greater than the predetermined value, or the difference is 0.

3. The display device according to claim 1,
- wherein the controller increases a ratio of a component corresponding to the second characteristic in the value of the gray scale of the target pixel of the second liquid crystal panel as a difference between the maximum value of the target pixel value and the minimum value of the target pixel value increases.

4. The display device according to claim 1,
- wherein the controller further determines the value of the gray scale of the target pixel of the second liquid crystal panel as:

$$(1-Min/Max)\times P2+(Min/Max)\times P1,$$

- wherein the maximum value of the target pixel value is Max, the minimum value of the target pixel value is Min, the value of the gray scale of the target pixel of the second liquid crystal panel determined with reference to only the first characteristic is P1, and the value of the gray scale of the target pixel of the second liquid crystal panel determined with reference to only the second characteristic is P2.

5. The display device according to claim 1,
- wherein the controller generates the first characteristic based on a product of the value of the gray scale of the target pixel of the second liquid crystal panel determined with reference to only the second characteristic and a predetermined coefficient of one or more.

6. The display device according to claim 5,
- wherein when the product is equal to or greater than an upper limit value of the gray scale of the target pixel of the second liquid crystal panel, the controller sets the upper limit value as the value of the gray scale of the target pixel of the second liquid crystal panel determined with reference to only the first characteristic.

7. A control method of a display device comprising a first liquid crystal panel and a second liquid crystal panel disposed on a back face of the first liquid crystal panel, the control method comprising:
- determining, based on a maximum value of a target pixel value of the first liquid crystal panel and/or the second liquid crystal panel and a surrounding pixel value of the first liquid crystal panel and/or the second liquid crystal panel and a minimum value of the target pixel value and the surrounding pixel value, a value of a gray scale of a target pixel of the second liquid crystal panel with reference to at least one of a plurality of conversion characteristics indicating characteristics different from each other configured to convert the maximum value of the target pixel value or the minimum value of the target pixel value into the value of the gray scale of the target pixel of the second liquid crystal panel, wherein the plurality of conversion characteristics includes a first characteristic and a second characteristic, and wherein, when the maximum value of the target pixel value and the minimum value of the target pixel value are identical, a value of the gray scale of the target pixel of the second liquid crystal panel determined with reference to only the first characteristic is equal to or more than a value of the gray scale of the target pixel of the second liquid crystal panel determined with reference to only the second characteristic.

* * * * *